(12) United States Patent
Govindan et al.

(10) Patent No.: US 9,221,694 B1
(45) Date of Patent: Dec. 29, 2015

(54) SELECTIVE SCALING IN DESALINATION WATER TREATMENT SYSTEMS AND ASSOCIATED METHODS

(71) Applicant: Gradiant Corporation, Woburn, MA (US)

(72) Inventors: Prakash Narayan Govindan, Melrose, MA (US); Steven Lam, Medford, MA (US); Maximus G. St. John, Boston, MA (US); Jonn-Ross Andrews, Somerville, MA (US)

(73) Assignee: Gradiant Corporation, Woburn, MA (US)

( * ) Notice: Subject to any disclaimer, the term of this patent is extended or adjusted under 35 U.S.C. 154(b) by 0 days.

(21) Appl. No.: 14/537,117

(22) Filed: Nov. 10, 2014

Related U.S. Application Data

(60) Provisional application No. 62/067,318, filed on Oct. 22, 2014.

(51) Int. Cl.
 *B01D 1/00* (2006.01)
 *B01D 3/00* (2006.01)
 (Continued)

(52) U.S. Cl.
 CPC .............. *C02F 1/042* (2013.01); *B01D 1/0041* (2013.01); *B01D 1/0082* (2013.01); *B01D 3/00* (2013.01);
 (Continued)

(58) Field of Classification Search
 CPC .. B01D 1/0011; B01D 1/0041; B01D 1/0047; B01D 1/0094; B01D 1/30; B01D 3/00; B01D 3/007; B01D 5/0033; B01D 5/0054; B01D 5/0078; B01D 1/00; B01D 1/0082; C02F 1/04; C02F 1/042; C02F 1/048; C02F 1/14; C02F 1/16; C02F 1/28; C02F 1/42; C02F 1/52; C02F 1/66; C02F 1/68; C02F 9/00; C02F 2303/22; C02F 2305/00; C02F 2101/10
 USPC .............. 210/696, 698, 259, 182, 195.1, 663, 210/669, 774, 805, 806; 159/47.1; 202/172, 202/174, 176, 183; 203/10, 11, 21, 25; 422/14, 16
 See application file for complete search history.

(56) References Cited

U.S. PATENT DOCUMENTS 2,640,018 A   5/1953  Heath
3,331,773 A * 7/1967  Gunderson et al. ........... 210/698

(Continued)

FOREIGN PATENT DOCUMENTS

CA       2818055      11/2013
CA       2821453       1/2014

(Continued)

OTHER PUBLICATIONS

Al-Hallaj et al., Solar desalination with a humidification-dehumidification cycle: performance of the unit. Desalination. 1998;120:273-80.

(Continued)

*Primary Examiner* — Joseph Drodge
(74) *Attorney, Agent, or Firm* — Wolf, Greenfield & Sacks, P.C.

(57) ABSTRACT

Selective scaling in water treatment systems in which desalination is performed is generally described. According to certain embodiments, the location of the formation of solid scale within a water treatment system is controlled by adjusting one or more system parameters, such as the temperature and/or flow velocity of a saline stream within the water treatment system.

23 Claims, 4 Drawing Sheets

(51) Int. Cl.
*C02F 1/42* (2006.01)
*C02F 9/00* (2006.01)
*C02F 1/04* (2006.01)
*C02F 1/52* (2006.01)
*C02F 101/10* (2006.01)

(52) U.S. Cl.
CPC ... *C02F 1/42* (2013.01); *C02F 1/52* (2013.01); *C02F 9/00* (2013.01); *C02F 2101/10* (2013.01); *C02F 2305/00* (2013.01)

(56) References Cited

U.S. PATENT DOCUMENTS

| | | | |
|---|---|---|---|
| 4,363,703 A * | 12/1982 | ElDifrawi et al. | 203/10 |
| 4,708,805 A * | 11/1987 | D'Muhala | 210/698 |
| 4,843,828 A | 7/1989 | Gladman | |
| 4,973,201 A | 11/1990 | Paul et al. | |
| 4,980,077 A | 12/1990 | Morris et al. | |
| 5,207,919 A * | 5/1993 | Breen et al. | 210/700 |
| 5,282,995 A | 2/1994 | Paul et al. | |
| 5,425,902 A | 6/1995 | Miller et al. | |
| 5,656,161 A | 8/1997 | Solomon et al. | |
| 6,919,000 B2 | 7/2005 | Klausner et al. | |
| 7,115,670 B2 | 10/2006 | Hensman et al. | |
| 7,225,620 B2 | 6/2007 | Klausner et al. | |
| 7,459,088 B2 | 12/2008 | Davis | |
| 7,465,376 B2 | 12/2008 | Neubert et al. | |
| 7,727,400 B2 | 6/2010 | Flynn | |
| 8,252,092 B2 | 8/2012 | Govindan et al. | |
| 8,292,272 B2 | 10/2012 | Elsharqawy et al. | |
| 8,496,787 B2 | 7/2013 | Lord | |
| 8,727,325 B2 | 5/2014 | Sparrow et al. | |
| 8,820,723 B1 | 9/2014 | Sparrow et al. | |
| 8,857,798 B1 | 10/2014 | Sparrow et al. | |
| 2004/0187897 A1 | 9/2004 | Kenowski et al. | |
| 2007/0181480 A1* | 8/2007 | Lee | 210/282 |
| 2010/0242995 A1 | 9/2010 | Xiong et al. | |
| 2010/0314238 A1 | 12/2010 | Frolov et al. | |
| 2011/0024354 A1 | 2/2011 | Xia et al. | |
| 2012/0125861 A1 | 5/2012 | Thiers | |
| 2013/0074694 A1 | 3/2013 | Govindan et al. | |
| 2013/0075940 A1 | 3/2013 | Govindan et al. | |
| 2013/0118887 A1 | 5/2013 | Frolov et al. | |
| 2013/0193074 A1* | 8/2013 | Voigt et al. | 210/638 |
| 2014/0197029 A1* | 7/2014 | Sparrow et al. | 204/519 |
| 2015/0096891 A1* | 4/2015 | Sparrow et al. | 204/519 |

FOREIGN PATENT DOCUMENTS

| | | |
|---|---|---|
| CA | 2816746 | 4/2014 |
| CA | 2821458 | 7/2014 |
| WO | WO 2007/128062 | 11/2007 |
| WO | WO 2012/159203 | 11/2012 |
| WO | WO 2013/159220 | 10/2013 |

OTHER PUBLICATIONS

El-Dessouky et al., Multiple-effect evaporation desalination systems: thermal analysis. Desalination. 1999;125:259-76.

Global Water Intelligence, Water Desalination Report. Tom Pankratz, ed. Dec. 17, 2012;48(48):1-4.

Klausner et al., Evaporative heat and mass transfer for the diffusion driven desalination process. Heat Mass Transfer. 2006;42:528-36.

Li, Mineral precipitation and deposition in cooling systems using impaired waters: mechanisms, kinetics, and inhibition. Dissertation defended Jul. 27, 2010. 224 pages.

Narayan et al., The potential of solar-driven humidification-dehumidification desalination for small-scale decentralized water production. Renewable and Sustainable Energy Reviews. 2010;14:1187-1201.

Narayan et al., Thermal design of the humidification desalination system: an experimental investigation. International Journal of Heat and Mass Transfer. 2013;58:1-9.

Narayan et al., Thermodynamic balancing of the humidification dehumidification desalination system by mass extraction and injection. International Journal of Heat and Mass Transfer. 2013;57:756-70.

Zamen et al., Improvement of solar humidification-dehumidification desalination using multi-stage process. 6 pages. Accessed Jun. 6, 2014.

* cited by examiner

SELECTIVE SCALING IN DESALINATION WATER TREATMENT SYSTEMS AND ASSOCIATED METHODS

RELATED APPLICATIONS

This application claims priority under 35 U.S.C. §119(e) to U.S. Provisional Patent Application Ser. No. 62/067,318, filed Oct. 22, 2014, and entitled "Selective Scaling in Desalination Water Treatment Systems and Associated Methods," which is incorporated herein by reference in its entirety for all purposes.

TECHNICAL FIELD

Water treatment systems including one or more desalination apparatuses in which selective scaling is employed, and associated methods, are generally described.

BACKGROUND

Desalination is a process by which some amount of salt and/or other minerals and one or more other components of a liquid solution are at least partially separated. For example, salt water can be desalinated to produce fresh water suitable for human consumption, irrigation, industrial use, and/or a variety of other uses. Most of the modern interest in desalination is focused on developing cost-effective ways of providing fresh water for human use.

As the world's population expands, the accompanying increase in demand for fresh water has led to fresh water shortages in many regions of the world. Desalination could potentially play a role in mitigating such shortages. Accordingly, improved water treatment systems and methods are desirable.

SUMMARY

Selective scaling in water treatment systems in which desalination is performed is generally described. According to certain embodiments, the formation of solid scale within a water treatment system is controlled by selecting and/or adjusting one or more system parameters, such as the temperature and/or flow velocity of a saline stream within the water treatment system. The subject matter of the present invention involves, in some cases, interrelated products, alternative solutions to a particular problem, and/or a plurality of different uses of one or more systems and/or articles.

Certain aspects relate to methods of desalinating water within a water treatment system. In some embodiments, the method comprises removing, within an ion-removal apparatus of the water treatment system, at least a portion of at least one scale-forming ion from a saline aqueous feed stream comprising the scale-forming ion and at least one dissolved monovalent salt to produce an ion-diminished stream containing less of the scale-forming ion relative to the saline aqueous feed stream. Some embodiments comprise transferring heat, within a heat exchanger of the water treatment system, from a first heat exchanger stream to at least a portion of the ion-diminished stream to heat the ion-diminished stream. Certain embodiments comprise evaporating, within a humidifier of the water treatment system, water from the heated ion-diminished stream into a gaseous stream to produce a concentrated saline stream, which is enriched in a dissolved monovalent salt relative to the saline aqueous feed stream, and a humidified gaseous stream. Some embodiments comprise condensing, within a dehumidifier of the water treatment system fluidically connected to the humidifier, water from the humidified gaseous stream to produce a water-containing stream and a dehumidified gaseous stream. In some such embodiments, scale is formed within the humidifier such that at least about 60 wt % of all scale formed in the water treatment system is formed in the humidifier.

Some embodiments are related to methods of desalinating water. In certain embodiments, the method comprises removing, within a desalination apparatus of a water treatment system, water from a saline aqueous feed stream to produce a concentrated saline stream enriched in a dissolved monovalent salt relative to the saline aqueous feed stream and a water-containing stream, and forming scale within the desalination apparatus such that at least about 60 wt % of all scale formed in the water treatment system is formed in a concentrator of the desalination apparatus and/or a packing-containing vessel of the water treatment system.

Certain embodiments are related to methods for removing scale from a humidification-dehumidification desalination apparatus. In some embodiments, the method comprises transporting a liquid composition comprising diethylenetriaminepentaacetic acid (DTPA) and oxalate anions to a humidification-dehumidification desalination apparatus such that the diethylenetriaminepentaacetic acid (DTPA) and/or oxalate anions remove at least a portion of scale from a solid surface of the humidification-dehumidification desalination apparatus.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
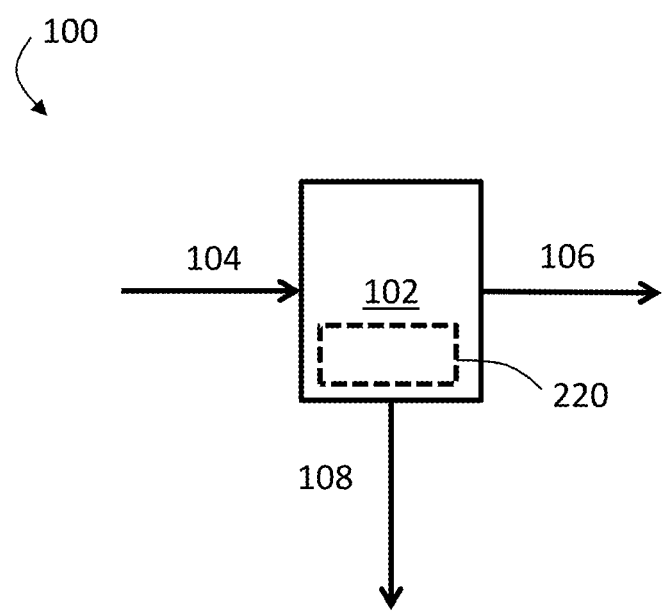
FIG. 1 is a schematic illustration of a water treatment system in which desalination is performed, according to certain embodiments.

Systems and methods related to selective scaling within a water treatment system for desalinating an aqueous solution containing one or more dissolved salts are generally described. Certain embodiments comprise selecting and/or manipulating a temperature and/or a flow velocity of a saline stream to selectively form scale. The scale can be selectively formed, in some embodiments, within a designated scaling zone, such as within a concentrator (e.g., a humidifier) of the desalination apparatus, or in another location. In some such embodiments, controlling the formation of scale can allow one to reduce or eliminate the amount of scaling that occurs within the water treatment system in unwanted locations.

Certain embodiments relate to the discovery that temperature and/or flow velocity of the saline aqueous stream can be selected and/or manipulated such that scaling occurs in a controlled fashion. It has been unexpectedly discovered, in accordance with certain embodiments, that scale inception (and, by extension, growth of scaling compounds post-inception) is significantly more probable in stagnant and laminar flow streams relative to turbulent flow streams. It has also been determined, in according with some embodiments, that scale inception within an aqueous stream can be controlled by selecting and/or adjusting the temperature of the aqueous stream. Accordingly, in some embodiments, the temperature and/or flow velocity of the saline aqueous stream fed to and/or contained within the desalination apparatus can be selected and/or controlled such that one or more scale-forming salts within the aqueous solution will form scale.

In certain embodiments, most or substantially all of the scale formation will occur within a selected volume (also referred to herein as the "scaling zone"). For example, the scale formation can occur on a surface that is part of the desalination apparatus (e.g., on the surface of a concentrator (e.g., a humidifier) or on a surface of a packing-containing vessel within the desalination apparatus). By controlling the manner in which scaling occurs within the water treatment system, one can reduce the negative effects caused by scaling (e.g., reduced heat transfer, occlusion of flow pathways, etc.) without having to completely eliminate scaling, which generally requires the complete removal of scale-forming ions from the feed water, an energy- and cost-intensive process.

In some embodiments, the control of scaling can be achieved, at least in part, by adjusting and/or maintaining the supersaturation index of the saline aqueous stream fed to and/or contained within the desalination apparatus within a desired range. For example, in certain embodiments, the water treatment system can be operated such that the supersaturation index within the saline aqueous solution entering the desalination apparatus (e.g., entering the concentrator, such as the humidifier, of the desalination apparatus and/or a heat exchanger of the desalination apparatus), with respect to scale-forming compounds, is at least about 0.9. In some embodiments, the water treatment system can be operated such that the supersaturation index within the saline aqueous solution entering the desalination apparatus (e.g., entering the concentrator, such as the humidifier, of the desalination apparatus and/or a heat exchanger of the desalination apparatus), with respect to scale-forming compounds is less than about 1.0. Control of the supersaturation index of the saline aqueous feed stream can be achieved, for example, by adjusting the amount of dissolved solids contained within the saline aqueous feed stream using an ion removal apparatus upstream of the desalination apparatus. For example, in some embodiments, the ion-removal apparatus can be configured such that the supersaturation index of the ion-diminished stream exiting the ion-removal apparatus, with respect to scale-forming compounds, is at least about 0.9 (and, in certain but not necessarily all embodiments, less than about 1.0).

FIG. 1 is an exemplary schematic illustration of water treatment system 100, which can be used to produce a recovered water stream from an aqueous solution containing at least one dissolved salt. In certain embodiments, the water treatment system comprises a desalination apparatus. The desalination apparatus can be configured to remove water from an aqueous stream received by the desalination apparatus to produce a concentrated saline stream enriched in a dissolved salt (e.g., enriched in a dissolved monovalent salt) relative to the aqueous stream received by the desalination apparatus. Referring to FIG. 1, for example, water treatment system 100 comprises desalination apparatus 102. The desalination apparatus may be, according to certain embodiments, configured to receive an aqueous feed stream (e.g., a saline aqueous feed stream), such as aqueous feed stream 104 in FIG. 1. In some embodiments, the desalination apparatus is configured to produce concentrated saline stream 106 enriched in a dissolved salt relative to aqueous feed stream 104 received by desalination apparatus 102.

The stream fed to the desalination apparatus contains, in certain embodiments, at least one dissolved monovalent salt. One advantage associated with certain (although not necessarily all) of the inventive systems and methods described herein is that they can be used to process streams with relatively high concentrations of dissolved monovalent salts. For example, in some embodiments, the stream fed to the desalination apparatus may contain dissolved monovalent salts in an amount of at least about 2 wt %, at least about 5 wt %, at least about 10 wt %, at least about 20 wt %, or at least about 25 wt % (and/or, in certain embodiments, up to the solubility limit).

Aqueous feed stream 104 can originate from a variety of sources. For example, in certain embodiments, at least a portion of the stream fed to the desalination apparatus comprises and/or is derived from seawater, ground water, brackish water, water from an oil and/or gas well, and/or the effluent of a chemical process (e.g., the effluent of another water treatment system (e.g., a water treatment system configured to perform desalination), or another chemical process).

In certain embodiments, the desalination apparatus can be configured to remove water from an aqueous saline stream to produce a concentrated saline stream that is enriched in a dissolved monovalent salt relative to the aqueous saline stream received by the desalination apparatus. In FIG. 1, for example and as noted above, desalination apparatus 102 is configured to remove water from aqueous saline feed stream 104 to produce concentrated saline stream 106. A dissolved salt is a salt that has been solubilized to such an extent that the component ions of the salt are no longer ionically bonded to each other. Generally, the term "monovalent salt" refers to a salt that includes a monovalent cation (i.e., a cation with a redox state of +1 when solubilized). Examples of monovalent salts include, but are not limited to, those containing sodium, potassium, lithium, rubidium, cesium, and francium. In certain embodiments, the monovalent salts include monovalent anions such as, for example, chlorine, bromine, fluorine, and iodine. Examples of monovalent salts include, but are not limited to, sodium chloride (NaCl), sodium bromide (NaBr), potassium chloride (KCl), potassium bromide (KBr), sodium carbonate ($Na_2CO_3$), sodium sulfate ($Na_2SO_4$), and the like.

According to certain embodiments, the concentrated saline stream produced by the desalination apparatus includes dissolved salts in relatively high amounts. For example, in some embodiments, the concentrated saline stream produced by the desalination apparatus includes dissolved salts such that the concentrated saline stream has a density, at 60° F., of from about 9 pounds per gallon to about 11 pounds per gallon, from about 9.5 pounds per gallon to about 10.5 pounds per gallon, or from about 9.8 pounds per gallon to about 10.2 pounds per gallon. In some embodiments, the concentrated saline stream produced by the desalination apparatus includes dissolved salts such that it has a density, at 60° F., of about 10 pounds per gallon.

The concentrated saline stream can also include dissolved scale-forming salts in relatively large amounts. In certain embodiments, the concentrated saline stream produced by the desalination apparatus includes dissolved scale-forming salts such that the supersaturation index (discussed in more detail below) of the concentrated saline stream, with respect to scale-forming compounds, is at least about 0.9. In some embodiments, the concentrated saline stream produced by the desalination apparatus includes dissolved scale-forming compounds such that the supersaturation index of the concentrated saline stream, with respect to scale-forming compounds, is at least about 0.9 and less than about 1.0.

In some embodiments, the desalination apparatus can also produce a water-containing stream that contains a lower concentration of the dissolved salt (e.g., dissolved monovalent salt) than the stream fed to the desalination apparatus. For example, in FIG. 1, desalination apparatus 102 can be configured to produce water-containing stream 108, which contains less of a dissolved salt (e.g., less of a dissolved monovalent salt) than aqueous feed stream 104 fed to desalination apparatus 102.

The desalination apparatus may be operated as follows. Certain embodiments comprise removing, within the desalination apparatus, water from a saline aqueous feed stream to produce a concentrated saline stream enriched in a dissolved monovalent salt relative to the saline aqueous feed stream and a water-containing stream. For example, referring to FIG. 1, aqueous feed stream 104 can be transported to desalination apparatus 102, in which water from the aqueous feed stream (e.g., comprising one or more dissolved monovalent salts) is removed to produce concentrated saline stream 106. In some embodiments, the concentrated saline stream is enriched in a dissolved monovalent salt relative to the aqueous feed stream (e.g., the saline aqueous feed stream). Operation of the desalination apparatus may also produce a water-containing stream that contains less dissolved monovalent salt than is present within the stream fed to the desalination apparatus. For example, in FIG. 1, removing water from aqueous feed stream 104 can produce water-containing stream 108, which contains less dissolved monovalent salt than is present within feed stream 104.

In some embodiments, the desalination apparatus is configured to produce a stream containing water of relatively high purity. For example, in some embodiments, the desalination apparatus produces a stream (e.g., water-containing stream 108 in FIG. 1) containing water in an amount of at least about 75 wt %, at least about 85 wt %, at least about 95 wt %, at least about 99 wt %, at least about 99.9 wt %, or at least about 99.99 wt % (and/or, in certain embodiments, up to about 99.999 wt %, or more).

A variety of types of desalination apparatuses may be used in the embodiments described herein. In some embodiments, the desalination apparatus comprises a humidification-dehumidification desalination apparatus.

Figure 2:
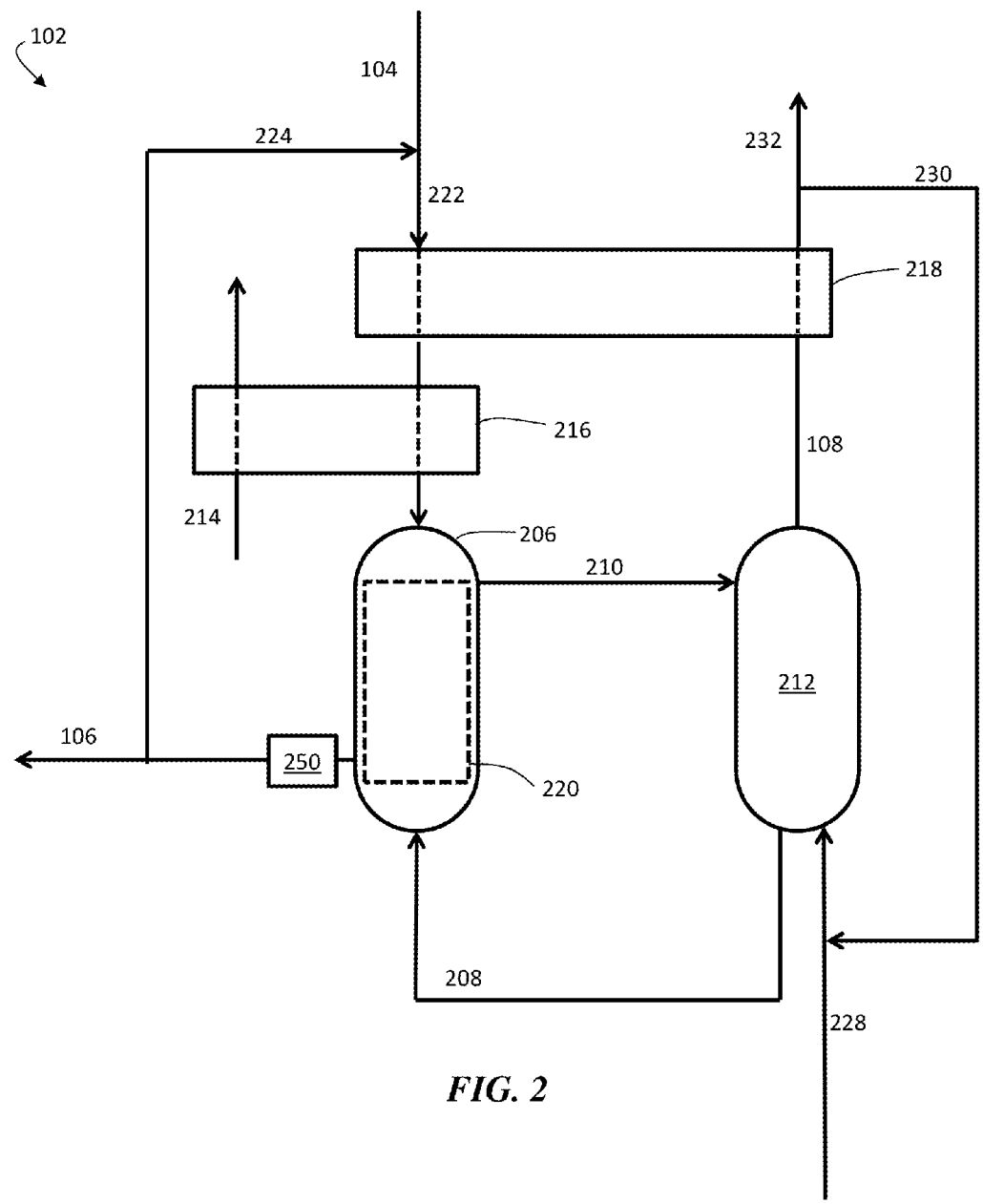
FIG. 2 is, according to some embodiments, a schematic illustration of a humidification-dehumidification desalination apparatus.

FIG. 2 is a schematic illustration of an exemplary desalination apparatus 102 which may be used in association with certain of the inventive systems and methods described herein. As described below, desalination apparatus 102 in FIG. 2 comprises a humidifier and a dehumidifier. Desalination apparatus 102 in FIG. 2 can also be referred to as a humidification-dehumidification desalination apparatus.

In the exemplary embodiment of FIG. 2, desalination apparatus 102 comprises humidifier 206, which can be configured to receive stream 104 (which may correspond to, for example, stream 104 in FIG. 1). Humidifier 206 may also be configured to receive gaseous stream 208. Gaseous stream 208 may comprise any gas capable of carrying water vapor. For example, gaseous stream 208 may comprise air, nitrogen, oxygen, a noble gas (e.g., helium, argon, etc.), and/or any other suitable gas. Humidifier 206 can be configured, in some embodiments, such that water is evaporated from aqueous feed stream 104 into gaseous stream 208 to produce a humidified gaseous stream 210 and a concentrated saline stream 106.

In the exemplary embodiment of FIG. 2, desalination apparatus 102 also comprises dehumidifier 212 fluidically connected to humidifier 206. Dehumidifier 212 can be configured to condense at least a portion of the water from gaseous stream 210 to produce a water-containing stream 108 and a dehumidified gaseous stream 208.

In certain embodiments, the dehumidifier is directly fluidically connected to the humidifier. For example, in FIG. 2, dehumidifier 212 is directly fluidically connected (via streams 210 and 208) to humidifier 206. In other embodiments, the humidifier and dehumidifier can be arranged such that they are fluidically connected to each other but are not directly fluidically connected to each other.

The humidification-dehumidification desalination apparatus may be operated as follows. In some embodiments, water is removed from the stream fed to the desalination apparatus (e.g., an ion-diminished stream and/or another stream fed to the desalination apparatus) to produce a concentrated saline stream enriched in the dissolved monovalent salt relative to the feed stream. The concentrated saline stream can be produced, for example, by humidifying a gaseous stream. This can be achieved, for example, by transporting the feed stream containing the at least one dissolved salt (e.g., a dissolved monovalent salt) to the humidifier. Referring to FIG. 2, for example, aqueous feed stream 104 containing at least one dissolved salt (e.g., at least one dissolved monovalent salt) and gaseous stream 208 can be fed to humidifier 206. In certain embodiments, humidifying the gaseous stream comprises contacting the gaseous stream with the aqueous saline stream fed to the desalination unit within the humidifier to evaporate at least a portion of the water from the aqueous saline feed stream into the gaseous stream. For example, in FIG. 2, water from aqueous feed stream 104 can be evaporated into gaseous stream 208 within humidifier 206 to produce a humidified gaseous stream 210 (which can contain water vapor) and a concentrated saline stream 106. Concentrated saline stream 106 can be transported away from the desalination apparatus and to a downstream processing apparatus.

In some embodiments, at least a portion of the concentrated saline stream can be mixed with the aqueous feed stream prior to transporting the aqueous feed stream to the humidifier. For example, in FIG. 2, a portion of concentrated saline stream 106 can be recirculated, via stream 224, and mixed with aqueous feed stream 104 to form a mixture within stream 222. Stream 222 can then be transported through heat exchanger 218 and/or heat exchanger 216 (described in more detail below), and eventually to humidifier 206. In some such embodiments, water can be evaporated from both stream 104 and stream 224 within humidifier 206. Recirculation of the concentrated saline stream is not required, however, and in other embodiments, the aqueous feed stream is fed directly to the humidifier. Referring to FIG. 2, for example, in some embodiments, none of concentrated saline stream 106 is transported through 224. In some such embodiments, the contents of stream 222 correspond to the contents of stream 104.

Some embodiments comprise transporting the gaseous stream to a dehumidifier and condensing at least a portion of the water within the gaseous stream. For example, referring to FIG. 2, humidified gaseous stream 210 can be transported to dehumidifier 212, in which water can be condensed to form water-containing stream 108 and dehumidified gaseous stream 208. In certain embodiments, including the set of embodiments illustrated in FIG. 2, at least a portion of the dehumidified gaseous stream can be recycled to humidifier 206 (e.g., in a closed loop) and used to remove water from an aqueous solution fed to the humidifier. In other embodiments, the dehumidified stream from the dehumidifier can be transported elsewhere within the system and/or vented.

The humidifier may have any configuration that allows for the transfer of water from the desalination feed stream to the gaseous stream. In certain embodiments, the humidifier comprises a vessel (e.g., a stainless steel tank or other vessel). The humidifier vessel can comprise a first input configured to receive an aqueous saline feed stream (e.g., aqueous feed stream 104 in FIGS. 1 and 2) and a second input configured to receive a gaseous stream into which water from the aqueous saline feed stream is vaporized.

In some embodiments, the humidifier comprises a device configured to produce droplets of the aqueous saline stream when the aqueous saline feed stream is transported through the device. For example, a nozzle, a notched trough distributor, or other spraying device may be positioned at the top of the humidifier such that the aqueous feed stream is distributed as droplets (e.g., sprayed) downward to the bottom of the humidifier. The use of a liquid distribution device (e.g., a spraying device) can increase the degree of contact between the aqueous saline stream fed to the humidifier and the gaseous stream into which water from the aqueous saline stream is transported. In some such embodiments, the gaseous stream can be transported in a counter-current direction, relative to the direction along which the aqueous saline stream is transported. For example, the gaseous stream may be transported into the bottom of the humidifier, through the humidifier vessel, and out of the top of the humidifier. In certain embodiments, the remaining portion of water that is not transported from the aqueous saline feed stream to the gaseous stream is collected at or near the bottom of the humidifier and transported out of the humidifier (and out of the water treatment system) as a concentrated saline stream (e.g., concentrated saline stream 106 in FIGS. 1 and 2).

In certain embodiments, humidifier 206, aqueous feed stream 104, stream 222 (which can be different from stream 104, for example, when recirculation via stream 224 is employed), and/or gaseous stream 208 may be heated before and/or during the humidification step. Heating one or more of these streams may increase the degree to which water is transferred from the aqueous saline feed stream to the gaseous stream within the humidifier. According to certain embodiments, the heating may be performed using a heat exchanger.

According to certain embodiments, the saline aqueous feed stream fed to the humidifier can be heated by at least one heat exchanger before it is fed to the humidifier. The heat exchanger may be configured, in some embodiments, to transfer heat from a heat exchanger stream to the saline aqueous feed stream (e.g., to stream 104 directly and/or to stream 222 when recirculation via stream 224 is employed). In some such embodiments, at least one heat exchanger can be used to transfer heat from a liquid stream to the saline aqueous feed stream before the saline aqueous feed stream is fed to the humidifier. For example, in some embodiments, the desalination apparatus of the water treatment system comprises a heat exchanger used to transfer heat from a liquid heated by a source of heat outside the desalination apparatus (such as a boiler) to the saline aqueous feed stream. As one example, desalination apparatus 102 in FIG. 2 includes optional heat exchanger 216, which can be used to transfer heat from liquid stream 214 to stream 222 (which contains at least a portion of saline aqueous feed stream 104 and, optionally, some of concentrated saline stream 106 when recirculation is employed) before saline aqueous feed stream 104 is fed to humidifier 206. Liquid stream 214 can be heated, for example, using a boiler or any other suitable heat source outside desalination apparatus 102. Generally, streams 214 and 222 (which contains at least a portion of saline aqueous feed stream 104 and, optionally, some of concentrated saline stream 106 when recirculation is employed) are kept fluidically isolated from each other within heat exchanger 216, such that the contents of the streams are not substantially mixed, but heat is transferred between them.

As another example, in some embodiments, the desalination apparatus of the water treatment system comprises a heat exchanger used to transfer heat from a liquid heated by a source of heat within the desalination apparatus to the saline aqueous feed stream. For example, desalination apparatus 102 in FIG. 2 includes optional heat exchanger 218, which can be used to transfer heat from water containing stream 108 to stream 222 (which contains at least a portion of saline aqueous feed stream 104 and, optionally, some of concentrated saline stream 106 when recirculation is employed) before saline aqueous feed stream 104 is fed to humidifier 206. The water within water containing stream 108 may be heated, for example, due to the latent heat of condensation associated with condensing water within gaseous stream 210 in dehumidifier 212. In this way, optional heat exchanger 218 can be used, according to certain embodiments, to recover heat that would otherwise be lost from desalination apparatus 102. Generally, streams 222 (which contains at least a portion of saline aqueous feed stream 104 and, optionally, some of concentrated saline stream 106 when recirculation is employed) and 108 are kept fluidically isolated from each other within heat exchanger 218, such that the contents of the streams are not substantially mixed, but heat is transferred between them.

According to certain embodiments, a first heat exchanger is used to transfer heat from a heat source within the desalination apparatus to the saline aqueous feed stream and, subsequently, a second heat exchanger is used to transfer heat from a heat source outside the desalination apparatus to the saline aqueous feed stream. For example, in FIG. 2, stream 222 (which contains at least a portion of aqueous feed stream 104 and, optionally, some of concentrated saline stream 106 when recirculation is employed) is transported to first heat exchanger 218, which is used to transfer heat from a heat source within the desalination apparatus (e.g., stream 108) to aqueous feed stream 104 (via stream 222). Subsequently, stream 222 (which contains at least a portion of aqueous feed stream 104) is transported to second heat exchanger 216, which is used to transfer heat from a heat source outside the desalination apparatus (e.g., stream 214) to aqueous feed stream 104 (via stream 222). While two heat exchangers are illustrated in FIG. 2, not all embodiments include both heat exchangers, and, in some embodiments, only heat exchanger 216 is included in desalination apparatus 102 or only heat exchanger 218 is included in desalination apparatus 102.

In certain embodiments, the heat exchanger(s) used to transfer heat from a first liquid to the saline aqueous feed stream is directly fluidically connected to the humidifier. For example, in FIG. 2, heat exchanger 216 can, in some embodiments, be configured and/or operated such that it is directly fluidically connected to humidifier 206. In some embodiments, heat exchanger 218 can be configured and/or operated such that it is directly fluidically connected to humidifier 206.

In some embodiments, no component of the saline aqueous feed stream changes in relative abundance by more than 5% between the humidifier and the heat exchanger(s) used to transfer heat from a first liquid to the saline aqueous feed stream. For example, in FIG. 2, heat exchanger 216 and humidifier 206 can be arranged and/or operated, according to some embodiments, such that no component of stream 222 (which contains at least a portion of saline aqueous feed stream 104) changes in relative abundance by more than 5% between heat exchanger 216 and humidifier 206. Similarly, referring to FIG. 2, heat exchanger 218 and humidifier 206 can be arranged and/or operated, according to certain embodiments, such that no component of stream 222 (which contains at least a portion of saline aqueous feed stream 104) changes in relative abundance by more than 5% between heat exchanger 218 and humidifier 206.

Any heat exchanger known in the art may be used to perform the heat transfer operations described herein. In some embodiments, the heat exchanger may be a liquid-to-liquid heat exchanger (i.e., the heat exchanger may be used to transfer heat from one liquid to another liquid). Examples of suitable heat exchangers include, but are not limited to, shell and tube heat exchangers, tube and tube heat exchangers, plate heat exchangers, plate and shell heat exchangers, plate and frame heat exchangers, and the like.

In some embodiments, humidifier 206 contains a packing material (e.g., polyvinyl chloride (PVC) packing material or other similar materials). The packing can facilitate enhanced direct contact between the aqueous saline stream and the gaseous stream within the humidifier.

The humidifier may be of any size, which will generally depend upon the number of humidifier units employed in the system and the total flow rate of aqueous saline solution that is to be desalinated. In certain embodiments, the total of the volumes of the humidifiers used in the water treatment system can be at least about 1 liter, at least about 10 liters, or at least about 100 liters (and/or, in some embodiments, up to about 1,000,000 liters, or more).

The dehumidifier may have any configuration that allows for the condensation of water from the vapor-containing gaseous stream fed to the dehumidifier. In certain embodiments, the dehumidifier comprises a vessel (e.g., a stainless steel tank or other vessel). The dehumidifier vessel can comprise a first input configured to receive a water-vapor-containing gaseous feed stream (e.g., humidified gaseous stream 210 in FIG. 2). The dehumidifier vessel can comprise a first outlet configured to output a dehumidified gaseous stream (e.g., gaseous stream 208 in FIG. 2) and a second outlet configured to output a water-containing stream containing a relatively high percentage of water (e.g., water-containing stream 108 in FIGS. 1 and 2).

In certain embodiments, a relatively cool water-containing stream can be transported into the dehumidifier. The relatively cool water-containing stream transported into the dehumidifier can act as a cooling source, which can cause condensation of water vapor from the humidified gaseous stream after it has been transported to the dehumidifier. For example, referring to FIG. 2, stream 228 can correspond to a relatively cool water-containing stream. Stream 228 can be transported to dehumidifier 212. The relatively low temperature of stream 228 can act as a source of cooling for dehumidifier 212, and can cause condensation of condensable water vapor from humidified gaseous stream 210. In some embodiments, water from stream 228 can be combined with condensed water (from water vapor in humidified gaseous stream 210) and subsequently transported out of the humidifier via stream 108. In certain embodiments, latent and/or sensible heat from condensation of water vapor from and/or cooling of humidified gaseous stream 210 can be removed from dehumidifier 212 via stream 108.

In some embodiments, and as noted elsewhere herein, heat can be recovered from stream 108 using heat exchanger 218. In some embodiments, after this heat recovery step, at least a portion of the water within stream 108 is removed from the desalination apparatus as a relatively pure water-containing stream (e.g., via stream 232 in FIG. 2). In certain embodiments, the amount of relatively pure water product that is removed from the desalination apparatus (e.g., via stream 232) is substantially equal to (e.g., within 5 wt % of) the amount of water condensed from humidified gaseous stream 210 within dehumidifier 212.

In certain embodiments, at least a portion of stream 108 is recycled back to dehumidifier 212. For example, in FIG. 2, at least a portion of stream 108 can be recycled back to and mixed with stream 228 via stream 230. Such recycling can be performed, for example, to provide cooling to the humidifier. In certain embodiments, stream 230 is directly recycled to stream 228 without additional cooling. In other embodiments, stream 230 can be cooled prior to being mixed with stream 228. In some embodiments, no additional water is added to the water stream recycled from the outlet of the dehumidifier back to the inlet of the dehumidifier. For example, referring to FIG. 2, in some embodiments, stream 228 is not present, and stream 230 is transported directly to dehumidifier 212 without adding additional water. In other embodiments, there is no recycling of water back to the dehumidifier. For example, referring to FIG. 2, in some embodiments, stream 230 is not present, and only stream 228 is used.

In certain embodiments, the dehumidifier is configured such that the gaseous stream directly contacts a liquid within the dehumidifier. In some embodiments, the humidifier is configured such that the gaseous stream directly contacts the saline aqueous feed stream within the humidifier. Configuring the humidifier and/or the dehumidifier such that direct contact between the gaseous stream and the liquid stream (e.g., the condensed liquid stream in the case of the dehumidifier, and the saline aqueous feed stream in the case of the humidifier) is maintained can be, in some embodiments, advantageous, as heat transfer to the gaseous phase may be enhanced in some such embodiments. Such arrangements can lead to more energy efficient condensation of the water vapor from the gaseous phase in the dehumidifier and/or more energy efficient evaporation of water vapor from the saline aqueous feed stream within the humidifier.

In certain embodiments, the dehumidifier comprises a bubble column condenser. Referring to FIG. 2, for example, humidified gaseous stream 210 from humidifier 206 may be transported to the bottom of dehumidifier 212, after which, the contents of stream 210 may be contacted with a condensed liquid at the bottom of dehumidifier 212. As the contents of humidified gaseous stream 210 are transported through the liquid within dehumidifier 212, at least a portion of the water vapor may be condensed and held at the bottom of the dehumidifier. Condensed water at the bottom of the dehumidifier may be transported out of the dehumidifier via water-containing stream 108, and dehumidified gas may be transported out of the top of dehumidifier via stream 208.

The dehumidifier can comprise a single stage in which liquid and vapor-containing gas are contacted or multiple stages on which liquid and vapor-containing gas are contacted. Each stage of the bubble-column condenser may comprise a bubble generator, such as a sieve plate, at the bottom of the stage. During operation, the condensed liquid may collect above the bubble generator, and the humidified gaseous stream may be bubbled through the condensed liquid by passing the gaseous stream through the bubble generator.

In certain embodiments in which multiple-stage bubble column condensers are employed as dehumidifiers, the inlet of the first stage can be coupled to the vapor-containing gas source and the outlet of the first stage can be coupled to the inlet of the second stage. Additional stages can be arranged such that outlets of a preceding stage are fluidically coupled to inlets of a subsequent stage, and the outlet of the final stage can be used as the outlet of the condenser (e.g., from which gaseous stream 208 originates in FIG. 2).

Suitable bubble-column condensers that may be used as the dehumidifiers in certain systems and methods described herein include those described in U.S. Patent Publication No. 2013/0075940, by Govindan et al., filed Jul. 12, 2012 as U.S. patent application Ser. No. 13/548,166, and entitled "Bubble-Column Vapor Mixture Condenser"; U.S. patent application Ser. No. 14/485,606, filed on Sep. 12, 2014, and entitled "Systems Including a Condensing Apparatus Such as a Bubble Column Condenser"; and U.S. patent application Ser. No. 14/494,101, filed on Sep. 23, 2014 and entitled "Desalination Systems and Associated Methods," each of which is incorporated herein by reference in its entirety for all purposes.

The dehumidifier may be of any size, which will generally depend upon the number of dehumidifier units employed in the water treatment system and the total flow rate of aqueous saline solution that is to be desalinated. In certain embodiments, the total of the volumes of the dehumidifiers used in the water treatment system can be at least about 1 liter, at least about 10 liters, or at least about 100 liters (and/or, in some embodiments, up to about 1,000,000 liters, or more).

The humidification-dehumidification apparatus can be operated at any suitable temperature and/or pressure. In some embodiments, the humidification-dehumidification desalination apparatus is operated at a pressure below 1 atmosphere.

It should be understood that the inventive systems and methods described herein are not limited to those including a humidification/dehumidification desalination apparatus, and that in other embodiments, other desalination apparatus types may be employed. In some embodiments, the desalination apparatus comprises a mechanical vapor compression apparatus. The mechanical vapor compression apparatus, in some embodiments, has a pressure ratio of 1.1 or higher across the compression apparatus. The mechanical vapor compression apparatus comprises, according to certain embodiments, a vane compression device and/or an axial compression device. In certain embodiments, the desalination apparatus comprises a forward osmosis desalination apparatus. In some embodiments, the desalination apparatus comprises a vacuum distillation desalination apparatus.

In some embodiments, the desalination apparatus comprises a hybrid desalination apparatus comprising a first desalination unit and a second desalination unit. In certain embodiments, in the hybrid desalination apparatus, the first unit is a reverse osmosis unit and the second unit is a humidification-dehumidification desalination apparatus. The humidification-dehumidification desalination apparatus can have any of the properties described above. For example, in some embodiments, the humidification-dehumidification desalination apparatus is operated at a pressure below 1 atmosphere. In certain embodiments, the humidification-dehumidification desalination apparatus comprises a dehumidifier comprising a bubble column condenser. In some embodiments, the humidification-dehumidification desalination apparatus comprises a plurality of conduits configured to discretely vary the ratio of a mass flow rate of air to a mass flow rate of liquid at intermediate points in the humidifier and/or the dehumidifier.

In certain embodiments, in the hybrid desalination apparatus, the first unit is a reverse osmosis unit and the second unit is a mechanical vapor compression apparatus. The mechanical vapor compression apparatus can have any of the properties described above. For example, in some embodiments, the mechanical vapor compression apparatus has a pressure ratio of 1.1 or higher across the compression apparatus. In certain embodiments, the mechanical vapor compression apparatus comprises a vane compression device and/or an axial compression device.

In certain embodiments, in the hybrid desalination apparatus, the first unit comprises a reverse osmosis unit and the second unit is a multi-effect distillation apparatus. In certain embodiments, in the hybrid desalination apparatus, the first unit is a reverse osmosis unit and the second unit is a multi-stage flash apparatus. In certain embodiments, in the hybrid desalination apparatus, the first unit is a reverse osmosis unit and the second unit is a vacuum distillation apparatus. In certain embodiments, in the hybrid desalination apparatus, the first unit is a reverse osmosis unit and the second unit is a membrane distillation apparatus. In some such embodiments, the membrane distillation apparatus is multi-staged.

Regardless of the particular form of the desalination apparatus, the desalination apparatus will generally comprise a concentrator. The concentrator of the desalination apparatus refers to the region of the desalination apparatus in which water is removed from an incoming saline stream to produce a stream containing the salt in more concentrated form. For example, in a humidification-dehumidification desalination apparatus, the humidifier would correspond to the concentrator. In a forward osmosis or reverse osmosis desalination apparatus, the retentate side of the osmotic membrane would correspond to the concentrator. In a vacuum distillation desalination apparatus, the volume to which the vacuum is applied would correspond to the concentrator. In a mechanical vapor compression desalination apparatus, the evaporator would correspond to the concentrator. Those of ordinary skill in the art, given the insight provided by the instant disclosure, would be capable of determining the component of a given desalination system that corresponds to the concentrator.

As noted above, certain embodiments relate to selecting and/or altering (e.g., controlling) one or more parameters of the water treatment system such that scale is formed within particular locations of the water treatment system, also referred to herein as "selective scaling." Certain embodiments comprise forming solid scale due to changes in physical and/or thermodynamic properties of a solution containing scale-forming ions. In some embodiments, selective scaling involves selecting and/or varying one or more physical and/or thermodynamic properties of a solution to cause the formation of scale from the solution.

Scale formation is a phenomenon known in the art. Generally, scale formation involves the formation of solid salts ("scale") on a surface that has a different chemical composition than the scale, and which surface is not transported along with the fluid from which the scale is deposited. For example, the deposition of solid salts from a fluid flowing through a humidifier on a wall of the humidifier and/or on the surface of a packing material that remains contained within the humidifier during operation of the humidifier would be considered scale formation. On the other hand, the formation of solid salts on suspended solids that are transported into and out of the humidifier during operation of the humidifier would not be considered scale formation. As another example, the precipitation of scale-forming ions (in which scale-forming ions are precipitated within a liquid, as described below within the ion-removal apparatus), would also not be considered scale formation.

The formation of scale within the water treatment system can involve the formation of any of a number of types of scale. In some embodiments, the scale that is selectively formed in the water treatment system comprises a salt comprising at least one of $Mg^{2+}$, $Ca^{2+}$, $Sr^{2+}$, and/or $Ba^{2+}$. In certain embodiments, the scale that is selectively formed in the water treatment system comprises a salt comprising at least one of carbonate anions ($CO_3^{2-}$), bicarbonate anions ($HCO_3^-$), sulfate anions ($SO_4^{2-}$), bisulfate anions ($HSO_4^-$), dissolved silica (e.g., $SiO_2(OH)_2^{2-}$, $SiO(OH)^{3-}$, $(SiO_3^{2-})_n$, and the like), and hydroxide ions ($OH^-$). In some embodiments, the scale that is selectively formed in the water treatment system is a salt comprising at least one of $Mg^{2+}$, $Ca^{2+}$, $Sr^{2+}$, and/or $Ba^{2+}$ and at least one of carbonate anions ($CO_3^{2-}$), bicarbonate anions ($HCO_3^-$), sulfate anions ($SO_4^{2-}$), bisulfate anions ($HSO_4^-$), dissolved silica (e.g., $SiO_2(OH)_2^{2-}$, $SiO(OH)^{3-}$, $(SiO_3^{2-})_n$. In some embodiments, the scale that is selectively formed in the water treatment system comprises a salt comprising at least one of $Mg^{2+}$, $Ca^{2+}$, $Sr^{2+}$, and/or $Ba^{2+}$ and at least one of carbonate anions ($CO_3^{2-}$), bicarbonate anions ($HCO_3^-$), sulfate anions ($SO_4^{2-}$), and bisulfate anions ($HSO_4^-$). In certain embodiments, the scale that is selectively formed in the water treatment system comprises a salt comprising strontium (e.g., $Sr^{2+}$), such as strontium sulfate.

In certain embodiments, the location of the scale formation can be controlled. For example, in certain embodiments, scale can be selectively formed within the desalination apparatus. In some such embodiments, scale can be selectively formed within the concentrator (e.g., the humidifier) of the desalination apparatus (e.g., on packing within the humidifier or other concentrator). Controlling the location of scaling can, according to certain embodiments, allow one to reduce or eliminate the amount of scaling that occurs in regions of the water treatment system in which scaling is not desired. For example, in certain embodiments, properties of the water treatment system can be controlled such that selective scaling occurs within a selected region (also referred to as the "scaling zone"). In some such embodiments, a large majority (or substantially all of) the scale formation occurs within the scaling zone. As noted above, controlling the location in which scaling occurs within the water treatment system can also allow for the reduction of the negative effects caused by scaling without having to substantially reduce the overall degree of or completely eliminate scaling, which generally requires the complete removal of scale-forming ions from the feed water, an energy- and cost-intensive process.

The formation of scale within the water treatment system can be controlled, according to some embodiments, by selecting and/or manipulating at least one parameter to control the saturation levels of various dissolved compounds. In certain embodiments, one or more physical and/or thermodynamic properties of the water treatment system can be selected and/or controlled such that scale is formed selectively. Some embodiments comprise selecting and/or manipulating temperature and/or flow velocity of the saline aqueous feed stream (and/or the ion-diminished stream, when ion-exchange is present) to selectively form scale within the scaling zone. This can be achieved, for example, by selecting and/or manipulating temperature and/or flow velocity of the saline aqueous feed stream such that the supersaturation index of the saline aqueous feed stream with respect to scale-forming compounds is 1.0 or greater. Some embodiments comprise selecting and/or manipulating temperature and/or flow velocity of the saline aqueous feed stream such that the supersaturation index of the saline aqueous feed stream with respect to scale-forming compounds increases as the saline aqueous feed stream is transported through the desalination apparatus (e.g., through the concentrator, such as the humidifier, of the desalination apparatus). Some embodiments comprise selecting and/or manipulating temperature and/or flow velocity of the saline aqueous feed stream such that the supersaturation index of the saline aqueous feed stream with respect to scale-forming compounds is increased from a first value below 1.0 to a second value above 1.0. Certain embodiments comprise selecting and/or manipulating temperature and/or flow velocity of the saline aqueous feed stream such that the supersaturation index of the saline aqueous feed stream with respect to scale-forming compounds is increased from a first above 1.0 to a second, higher value above 1.0.

The supersaturation index for a particular solution, with respect to its scale-forming compounds, is calculated as follows. First, the supersaturation level of each scale-forming compound within the solution is calculated. For each dissolved scale-forming compound (i.e., cation and anion pair) the supersaturation level is calculated by dividing the amount of that compound present in the solvent by the saturation limit of that compound in the solvent at the temperature, pressure, and flow velocity of operation, ignoring any co-solvent effects that may be present. A particular compound is said to be at its saturation limit (and the solution is said to be saturated with respect to that particular compound) when the amount of the dissolved compound within the solution is at a level such that any added amount of the compound will not dissolve in the solution. Solutions with saturation levels of 1.0 with respect to a particular compound are said to be saturated with respect to that compound, while solutions with saturation levels of greater than 1.0 are said to be supersaturated with respect to that compound.

If one of the anions or cations of a scale-forming compound is present in stoichiometric excess, the amount of compound dissolved in the solvent is determined based on the stoichiometrically-limiting ion. For example, if the solution contains excess calcium cations and a stoichiometrically limiting amount of sulfate anions, the amount of calcium sulfate dissolved in the solution corresponds to the amount of calcium sulfate that would be formed if all sulfate anions within the solution formed a solid precipitate with the available calcium cations.

After the supersaturation level of each scale-forming compound within the solution has been calculated, the supersaturation index of the overall solution is determined as the highest supersaturation level of all of the dissolved scale-forming compounds present within the solution.

As one illustrative example, a solution could contain dissolved calcium and potassium cations and dissolved carbonate and sulfate anions. To calculate the supersaturation index of such a solution, one would calculate the supersaturation level of each of calcium carbonate, calcium sulfate, potassium carbonate, and potassium sulfate within the solution. The supersaturation index of the solution would then correspond to the largest of the supersaturation levels of calcium carbonate, calcium sulfate, potassium carbonate, and potassium sulfate.

Control of the supersaturation index of the saline aqueous feed stream can be achieved, for example, by selecting and/or adjusting the temperature of the saline aqueous feed stream. Some embodiments comprise transferring thermal energy to the saline aqueous feed stream (and/or the ion-diminished stream, when upstream ion-exchange is present) to form scale. For example, in some cases, the solubility of ions decreases as the solution temperature increases. In some such cases, transferring thermal energy to the solution may cause the solution to pass from a sub-saturated regime to a saturated regime, after which, solid scale may form on surfaces exposed to the solution. In certain embodiments, thermal energy can be transferred out of the saline aqueous feed stream (and/or the ion-diminished stream, when upstream ion-exchange is present), for example via cooling, to form scale within the scaling zone. Such transfer of thermal energy out of the saline stream may be performed, for example, when the solubility of the compounds dissolved in the solution decreases with decreasing temperatures.

Temperature selection and/or control of a saline aqueous stream can be performed using any suitable temperature selection and/or control equipment. In some embodiments, a heater can be used to provide thermal energy to the saline aqueous stream (which can maintain and/or increase the temperature of the saline aqueous stream). In certain embodiments, a heat exchanger (e.g., a shell-and-tube heat exchanger, a thermoelectric device (e.g., Peltier device) or any other suitable type of heat exchanger) can be used to provide thermal energy to and/or transport thermal energy away from the saline aqueous stream (which can result in maintaining, increasing, and/or decreasing the temperature of the saline aqueous stream). Other equipment suitable for selecting and/or manipulating the temperature within a liquid stream can also be used.

It has been determined that the flow velocity of a saline aqueous stream can be utilized to impact the degree to which dissolved scale-forming compounds are deposited as scale from the saline aqueous stream onto surfaces exposed to the saline aqueous stream, and that flow velocities can thus be used to control the degree to which scaling occurs from a liquid containing a dissolved scale-forming salt. Accordingly, certain embodiments involve selecting and/or controlling the flow velocity of aqueous streams to control scale formation (and, in some embodiments, subsequent scale removal). For example, in certain embodiments, the flow velocity of an aqueous saline stream can be selected and/or controlled such that scale is formed within the water treatment system. In some embodiments, scale is formed within a designated scaling zone within the water treatment system (e.g., within a desalination apparatus of the water treatment system, such as within a concentrator (e.g., a humidifier) of the desalination apparatus and/or a packing-containing vessel of the desalination apparatus). In some such embodiments, little or no scale is formed outside the scaling zone in the water treatment system.

Some embodiments comprise selectively causing scale formation by operating the water treatment system such that the flow velocity of the saline aqueous feed stream within the desalination apparatus is lower than the flow velocity of the saline aqueous feed stream elsewhere in the water treatment system. In certain embodiments, the water treatment system is operated such that the flow velocity of a saline stream within the concentrator of the desalination apparatus (such as the humidifier of the desalination apparatus) is lower than the flow velocity of the saline stream elsewhere in the water treatment system. In certain embodiments, the water treatment system is operated such that the flow velocity of a saline stream within a packing-containing vessel (e.g., within a concentrator such as a humidifier and/or within another vessel containing packing elsewhere in the water treatment system) is lower than the flow velocity of the saline stream elsewhere in the water treatment system. Establishing low flow velocities and/or reducing the flow velocity of a saline stream can be achieved in a number of ways. For example, in certain embodiments, the throughput of a pump used to transport the saline stream can be altered to adjust the flow rate of the saline stream. In some cases, the saline stream can be transported from a conduit with a relatively small cross-sectional diameter to a conduit with a relatively large cross-sectional diameter, causing a reduction in the linear flow rate of the saline stream. In some such embodiments, one or more valves can be actuated, after which, the saline stream is transported through a conduit with a larger cross-sectional diameter than the conduit through which the saline stream was being transported prior to actuation of the one or more valves. In some embodiments, the flow velocity of the saline stream can be reduced by transporting the saline stream to a holding vessel.

Selective scaling can be achieved in any suitable region of the water treatment system. In some embodiments, at least a portion of the scaling occurs within the desalination apparatus. For example, referring to FIG. 1, at least a portion of the scaling can occur within zone 220, within the volume occupied by desalination apparatus 102. In some embodiments, at least a portion of the scaling occurs within a concentrator of the desalination apparatus, such as within a humidifier of the desalination apparatus. For example, referring to FIG. 2, at least a portion of the scaling can occur within humidifier 206, as indicated by scaling zone 220. In some embodiments, at least a portion of the scaling occurs within a volume in which packing is contained. For example, in some embodiments, the concentrator (e.g., the humidifier) of the desalination apparatus can contain a packing material, and scaling can selectively occur on the packing material. In some embodiments, the volume containing the packing can be outside the concentrator (e.g., within a vessel close to and outside (e.g., downstream of) the concentrator), and scaling can selectively occur within the volume containing the packing. Generally, the location of the scaling within the desalination apparatus can be selected and/or controlled by selecting and/or manipulating the supersaturation index of the aqueous saline solution within the desalination apparatus using, for example, the methods described elsewhere herein. For example, in some embodiments, a heater, a heat exchanger, or any other suitable temperature control device can be incorporated into the desalination apparatus and operated to select and/or manipulate the temperature of the saline aqueous solution within the desalination apparatus (e.g., within the concentrator, such as the humidifier, of the desalination apparatus or within a packing-containing vessel). In some embodiments, pumps, valves, and/or other flow control mechanisms can be incorporated into the desalination apparatus and controlled to establish and/or manipulate the flow velocity of the saline aqueous solution such that scale is formed within the desalination apparatus (e.g., within a concentrator, such as the humidifier, of the desalination apparatus and/or within a packing-containing vessel of the desalination apparatus).

In some embodiments, the scaling (e.g., within the desalination apparatus, such as within a concentrator (e.g., humidifier) within the desalination apparatus) occurs on a surface that is removable from the water treatment system. In some embodiments, at least a portion of the scaling occurs on a surface that is removable from the concentrator (e.g., humidifier) of the desalination apparatus. Generally, a surface is removable from another component when the surface and the component can be separated from each other without permanently damaging the surface and without permanently damaging the component. Removable surfaces can be installed into a component, for example, by sliding the surface into the component (e.g., using a friction fitting), by screwing the surface into the component, or via any of a variety of other suitable methods.

As one example, in some embodiments, at least a portion of the scaling occurs on at least a portion of exposed surface of packing within the concentrator (e.g., humidifier) and/or within another packing-containing vessel of the water treatment system. In some such embodiments, the packing within the concentrator (e.g., humidifier) or other vessel can be removed (and, optionally, cleaned and/or recycled) after scale has formed. The scaled packing can be replaced with replacement (e.g., clean) packing, while the scaled packing is cleaned and/or disposed of. In some embodiments, the concentrator (e.g., humidifier) and/or the packing-containing vessel includes a removable lining present over at least a portion of the surface of the concentrator and/or packing-containing vessel that contacts the saline aqueous liquid fed to the concentrator and/or packing-containing vessel. In some such embodiments, at least a portion of the scaling occurs on the removable lining within the concentrator and/or packing-containing vessel.

In certain embodiments, the amount of scaling that occurs within the scaling zone (i.e., due to "selective scaling") represents a relatively large percentage of the overall amount of scaling within the water treatment system. In some embodiments, at least about 60 wt %, at least about 75 wt %, at least about 90 wt %, at least about 95 wt %, at least about 99 wt %, or substantially all of the scaling that occurs within the water treatment system occurs within a designated scaling zone. In certain embodiments, the amount of scaling that occurs within the scaling zone (i.e., due to "selective scaling") represents a relatively large percentage of the overall amount of scaling within the desalination apparatus. In some embodiments, at least about 60 wt %, at least about 75 wt %, at least about 90 wt %, at least about 95 wt %, at least about 99 wt %, or substantially all of the scaling that occurs within the desalination apparatus occurs within a designated scaling zone (e.g., a concentrator (such as a humidifier) and/or a packing-containing vessel).

In some embodiments, at least about 60 wt %, at least about 75 wt %, at least about 90 wt %, at least about 95 wt %, at least about 99 wt %, or substantially all of the scaling that occurs within the water treatment system occurs within a concentrator (e.g., the humidifier) of the desalination apparatus. For example, in some embodiments, the water treatment system comprises an ion-removal apparatus and a desalination apparatus comprising a humidifier, a dehumidifier, and at least one heat exchanger configured to transfer heat to an aqueous solution before it is transported to the humidifier (e.g., heat exchanger 216 and/or heat exchanger 218 in FIG. 2). In some such embodiments, at least about 60 wt %, at least about 75 wt %, at least about 90 wt %, at least about 95 wt %, at least about 99 wt %, or substantially all of the scaling that occurs within the water treatment system (which comprises all of the components in the preceding sentence) occurs within the humidifier of the desalination apparatus.

In some embodiments, at least about 60 wt %, at least about 75 wt %, at least about 90 wt %, at least about 95 wt %, at least about 99 wt %, or substantially all of the scaling that occurs within the desalination apparatus occurs within a concentrator (e.g., humidifier) of the desalination apparatus. For example, in some embodiments, the desalination apparatus comprises a humidifier, a dehumidifier, and at least one heat exchanger configured to transfer heat to the aqueous solution before it is transported to the humidifier (e.g., heat exchanger 216 and/or heat exchanger 218 in FIG. 2). In some such embodiments, at least about 60 wt %, at least about 75 wt %, at least about 90 wt %, at least about 95 wt %, at least about 99 wt %, or substantially all of the scaling that occurs within the desalination apparatus occurs within the humidifier of the desalination apparatus.

In some embodiments, at least about 60 wt %, at least about 75 wt %, at least about 90 wt %, at least about 95 wt %, at least about 99 wt %, or substantially all of the scaling that occurs within the water treatment system occurs within the concentrator (e.g., the humidifier) and/or a vessel containing a packing material. For example, in some embodiments, the water treatment system comprises an ion-removal apparatus and a desalination apparatus comprising a humidifier (optionally, containing a packing material), a dehumidifier, and at least one heat exchanger configured to transfer heat to an aqueous solution before it is transported to the humidifier (e.g., heat exchanger 216 and/or heat exchanger 218 in FIG. 2). In some such embodiments, at least about 60 wt %, at least about 75 wt %, at least about 90 wt %, at least about 95 wt %, at least about 99 wt %, or substantially all of the scaling that occurs within the water treatment system (which comprises all of the components in the preceding sentence) occurs within the humidifier of the desalination apparatus. As another example, in some embodiments, the water treatment system comprises an ion-removal apparatus and a desalination apparatus comprising a humidifier (optionally, containing a packing material), a dehumidifier, at least one heat exchanger configured to transfer heat to an aqueous solution before it is transported to the humidifier (e.g., heat exchanger 216 and/or heat exchanger 218 in FIG. 2), and a packing-containing vessel (e.g., such as vessel 250 located downstream of humidifier 206 in FIG. 2). In some such embodiments, at least about 60 wt %, at least about 75 wt %, at least about 90 wt %, at least about 95 wt %, at least about 99 wt %, or substantially all of the scaling that occurs within the water treatment system (which comprises all of the components in the preceding sentence) occurs within the humidifier and/or the packing-containing vessel of the desalination apparatus.

In some embodiments, at least about 60 wt %, at least about 75 wt %, at least about 90 wt %, at least about 95 wt %, at least about 99 wt %, or substantially all of the scaling that occurs within the desalination apparatus occurs within a concentrator (e.g., humidifier) and/or a vessel containing a packing material of the desalination apparatus. For example, in some embodiments, the desalination apparatus comprises a humidifier (optionally, containing a packing material), a dehumidifier, and at least one heat exchanger configured to transfer heat to an aqueous solution before it is transported to the humidifier (e.g., heat exchanger 216 and/or heat exchanger 218 in FIG. 2). In some such embodiments, at least about 60 wt %, at least about 75 wt %, at least about 90 wt %, at least about 95 wt %, at least about 99 wt %, or substantially all of the scaling that occurs within the desalination apparatus occurs within the humidifier of the desalination apparatus. As another example, in some embodiments, the desalination apparatus comprises a humidifier, a dehumidifier, at least one heat exchanger configured to transfer heat to the aqueous solution before it is transported to the humidifier (e.g., heat exchanger 216 and/or heat exchanger 218 in FIG. 2), and a packing-containing vessel (e.g., such as vessel 250 in FIG. 2). In some such embodiments, at least about 60 wt %, at least about 75 wt %, at least about 90 wt %, at least about 95 wt %, at least about 99 wt %, or substantially all of the scaling that occurs within the desalination apparatus occurs within the humidifier and/or the packing-containing vessel of the desalination apparatus.

The packing (e.g., within the concentrator (e.g., humidifier) and/or the packing-containing vessel) can be of any suitable type. In some embodiments, the packing comprise pellets (e.g., polyvinyl chloride (PVC) packing material, glass-filled polypropylene packing material, or other similar materials), mesh (e.g., wire mesh), shavings (e.g., wood shavings), plates, trays, and/or rings (e.g., Raschig rings). According to certain embodiments, the packing material can be configured to be removable from the vessel in which it is contained. That is to say, the packing material can be configured such that it may be separated from the vessel without permanently damaging the vessel and the packing. As one particular example, particles, shavings, rings, and the like can be loaded into a vessel (e.g., a humidifier) such that, after use, removal of the packing can be achieved without destroying the packing or damaging the walls of the vessel. As another example, use of mesh, trays, plates, and the like can involve, in some embodiments, sliding the mesh, trays, and/or plates into the vessel (e.g., using a friction fitting) and/or by screwing the mesh, trays, and/or plates surface into the vessel.

According to certain embodiments, the water treatment system can comprise an optional ion-removal apparatus. The ion-removal apparatus can be configured to remove at least a portion of at least one scale forming ion from an input stream received by the ion-removal apparatus to produce an ion-diminished stream. Generally, the ion-diminished stream contains less of the scale-forming ion (e.g., a scale-forming cation and/or a scale-forming anion) relative to the input stream received by the ion-removal apparatus. In some embodiments, removing at least a portion of the at least one scale-forming ion within the ion-removal apparatus comprises precipitating at least a portion of the at least one scale-forming ion within the ion-removal apparatus, as described in more detail below.

The scale-forming ion-removal step can be performed, in certain embodiments, prior to transporting the saline aqueous feed stream to the desalination apparatus. Thus, in certain embodiments, the use of the ion-removal apparatus to remove scale-forming ions can reduce the level of scaling within the desalination apparatus and/or other unit operations downstream of the ion-removal apparatus.

Figure 3:
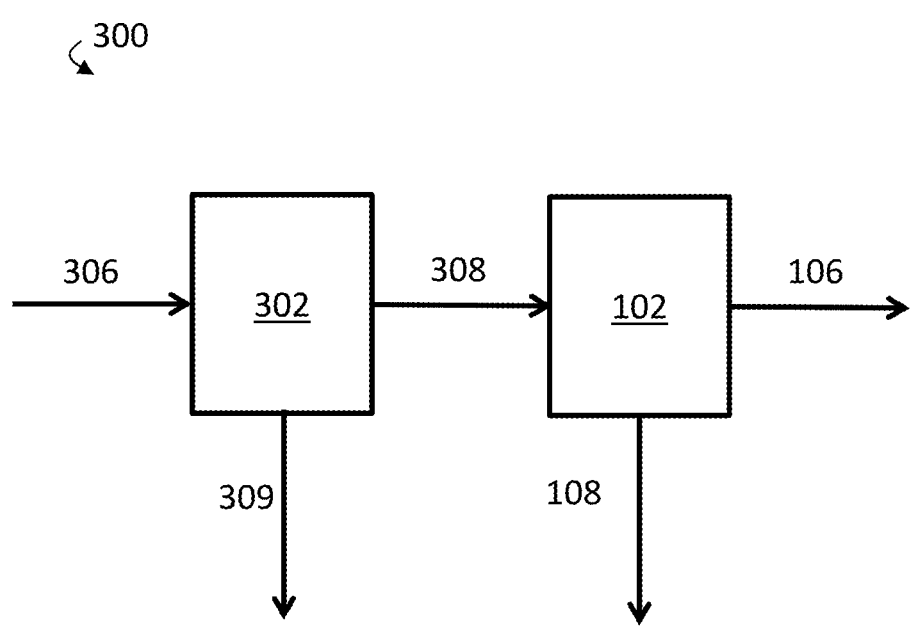
FIG. 3 is a schematic illustration of a water treatment system comprising an ion-removal apparatus and a desalination apparatus, according to certain embodiments.

For example, referring to FIG. 3, water treatment system 300 comprises ion-removal apparatus 302. Ion-removal apparatus 302 can be configured, according to certain embodiments, to remove at least a portion of at least one scale-forming ion from aqueous feed stream 306 received by ion-removal apparatus 302. Ion-removal apparatus 302 can be configured to produce ion-diminished stream 308, which contains less of the scale-forming ion relative to input stream 306 received by ion-removal apparatus 302. In certain embodiments, at least a portion of ion-diminished stream can be transported to the desalination apparatus. For example, in FIG. 3, ion-diminished stream 308 is transported to desalination apparatus 102. In this example, stream 308 can correspond to stream 104 in FIGS. 1 and 2. In certain embodiments, humidification-dehumidification desalination apparatus 102 illustrated in FIG. 2 can be used as the desalination apparatus in FIG. 3.

The ion-removal apparatus can also produce a stream that is enriched in the scale-forming ion relative to the stream fed to the ion-removal apparatus. For example, in FIG. 3, ion-removal apparatus 302 can be configured to produce stream 309, which is enriched in at least one scale-forming ion relative to stream 306. Alternatively, the scale forming ions removed from stream 306 can, in certain embodiments, remain contained within ion-removal apparatus 302.

In certain embodiments, the ion-removal apparatus removes at least a portion of at least one scale-forming ion while allowing a dissolved monovalent salt to remain dissolved in the aqueous stream transported out of the ion-removal apparatus.

The ion-removal apparatus can be configured to remove any scale-forming ion that is desired to be removed. Those of ordinary skill in the art are familiar with scale-forming ions, which are ions that tend to form solid scale when present in concentrations exceeding their solubility levels. Examples of scale forming ions include multivalent cations (e.g., $Mg^{2+}$, $Ca^{2+}$, $Sr^{2+}$, $Ba^{2+}$, and the like) and scale forming anions such as carbonate anions ($CO_3^{2-}$), bicarbonate anions ($HCO_3^-$), sulfate anions ($SO_4^{2-}$), bisulfate anions ($HSO_4^-$), dissolved silica (e.g., $SiO_2(OH)_2^{2-}$, $SiO(OH)^{3-}$, $(SiO_3^{2-})_n$, and the like), hydroxide ions ($OH^-$), and the like.

In some embodiments, the ion-removal apparatus is configured to remove at least one scale-forming cation. The scale-forming cation may be a multivalent cation, such as a bivalent cation, in some embodiments. For example, the ion-removal apparatus can be configured to remove, according to some embodiments, $Mg^{2+}$, $Ca^{2+}$, $Sr^{2+}$, and/or $Ba^{2+}$. Other scale-forming cations may also be removed using the ion-removal apparatus, according to certain embodiments. In some embodiments, the ion-removal apparatus is configured to remove at least one scale-forming anion. Non-limiting examples of scale-forming anions the ion-removal apparatus can be configured to remove include carbonate anions ($CO_3^{2-}$), bicarbonate anions ($HCO_3^-$), sulfate anions ($SO_4^{2-}$), bisulfate anions ($HSO_4^-$), and/or dissolved silica (e.g., $SiO_2(OH)_2^{2-}$, $SiO(OH)^{3-}$, $(SiO_3^{2-})_n$, and the like). In some embodiments, the ion-removal apparatus is configured to remove one or more multivalent scale-forming anions, such as one or more bivalent scale-forming anions (e.g., carbonate anions ($CO_3^{2}$) and/or sulfate anions ($SO_4^{2}$)).

In some instances, the scale-forming ions that are removed from the aqueous feed stream using the ion-removal apparatus may be sparingly soluble (e.g., having a solubility of less than about 1 gram per 100 grams of water, less than about 0.1 grams per 100 grams of water, or less than about 0.01 grams per 100 grams of water (or lower) at 20° C.), and therefore, may be prone to scaling within various parts of the water treatment system. Examples of sparingly soluble salts containing scale-forming ions include, but are not limited to, calcium carbonate ($CaCO_3$), which has a solubility of about 0.000775 grams per 100 grams of water at 20° C.; calcium sulfate ($CaSO_4$), which has a solubility of about 0.264 grams per 100 grams of water at 20° C.; magnesium hydroxide ($Mg(OH)_2$), which has a solubility of about 0.0009628 grams per 100 grams of water at 20° C.; and barium sulfate ($BaSO_4$), which has a solubility of about 0.000285 grams per 100 grams of water at 20° C.

In certain embodiments, the ion-removal apparatus is configured to remove at least one scale-forming ion from a stream containing relatively high levels of scale-forming ions. For example, in some embodiments, the saline aqueous feed stream fed to the ion-removal apparatus contains supersaturated levels of ions of at least one scale-forming compound. In certain embodiments, the saline aqueous feed stream fed to the ion-removal apparatus contains supersaturated levels of $BaSO_4$, $SrSO_4$, $BaCO_3$, and/or $SrCO_3$ prior to being transported to the ion-removal apparatus.

The ion-removal apparatus can be used, in some embodiments, to alter the supersaturation index of the saline aqueous feed stream, with respect to scale-forming compounds, to less than about 1.0. For example, in some embodiments, the supersaturation index of the saline aqueous feed stream exiting the ion-removal apparatus, with respect to scale-forming compounds, is at least about 0.9 and less than about 1.0. By using the ion-apparatus to output a saline aqueous stream with a supersaturation index of at least 0.9 and less than about 1.0, one can inhibit (or eliminate) the formation of scale at certain locations downstream of the ion-removal apparatus without wasting energy that would be needed to completely eliminate all downstream scaling, thus avoiding unnecessary expense. In some embodiments, the saline aqueous stream having a supersaturation index of at least 0.9 and less than about 1.0 can be used as at least part of the input to the desalination apparatus downstream of the ion-removal apparatus.

A variety of types of ion-removal apparatuses may be used in the embodiments described herein.

In some embodiments, the ion-removal apparatus comprises an ion-removal medium, which can be contained, for example, within a vessel.

In some embodiments, the ion-removal apparatus comprises a chemical ion-removal apparatus. In some embodiments, the chemical ion-removal apparatus comprises an ion-removal composition configured to induce precipitation of the at least one scale-forming ion. Precipitating the scale-forming ion (as opposed to allowing the scale-forming ion to form scale on a solid surface) can prevent or reduce scaling at locations downstream of the precipitation process. For example, the chemical ion-removal apparatus can be configured to remove at least one ion using caustic soda, soda ash, and/or an anionic polymer. In some embodiments, the ion-removal composition can be configured to induce precipitation of at least one scale-forming cation. For example, when caustic soda and/or soda ash are added to a stream containing $Ca^{2+}$ and/or $Mg^{2+}$, at least a portion of $Ca^{2+}$ and/or $Mg^{2+}$ contained within the stream may be precipitated as an insoluble solid (such as, for example, calcium carbonate and/or magnesium hydroxide) within the bulk of the liquid in the ion-removal apparatus. In some embodiments, an anionic polymer may be used as the ion-removal medium. In some embodiments, the composition can be configured to induce precipitation of at least one scale-forming anion. For example, a cationic polymer can be used as an ion-removal medium to precipitate and remove scale-forming anions within the bulk of the liquid in the ion-removal apparatus. Mixtures of the above-mentioned ion-removal media and/or other ion-removal media may also be used.

In certain embodiments, the ion-removal apparatus comprises an electrocoagulation apparatus. The electrocoagulation apparatus can be configured, in some embodiments, to remove at least a portion of suspended solids from the aqueous stream rather than, or in addition to, removing at least a portion of at least one scale-forming ion from the aqueous stream. Those of ordinary skill in the art are familiar with electrocoagulation, in which short wave electrolysis can be used to remove at least a portion of multivalent ions and/or suspended contaminants.

In certain embodiments, the ion-removal apparatus comprises a resin bed. The resin bed contains, according to certain embodiments, an ion-exchange resin. The resin bed can comprise, for example, an anion selective resin bed and/or a cationic selective resin bed. In certain embodiments, the ion-removal apparatus is an ion-exchange apparatus. The ion-exchange apparatus may contain, for example, an ion-exchange medium. Those of ordinary skill in the art are familiar with the function of ion-exchange media, which generally remove at least one scale-forming ion from a solution and, in some but not all cases, replace the scale-forming ion(s) with one or more monovalent ion(s). For example, in certain embodiments, the ion-exchange medium functions by contacting the aqueous solution containing the scale-forming ion(s), after which at least a portion of the scale-forming ions are captured by the ion-exchange medium and at least a portion of the monovalent ions originally contained within the ion-exchange medium are released into the aqueous solution. In some such embodiments, the ion-exchange medium comprises an ion exchange resin.

Those of ordinary skill in the art would be capable of selecting an appropriate ion-removal medium (e.g., an ion-exchange medium or other ion-removal medium) for use in the ion-removal apparatus based upon the types of scale-forming ions dissolved in the stream fed to the ion-removal apparatus, the concentration of said ions, and the flow rate at which one desires to operate the ion-removal apparatus, among other factors. The ion-removal apparatus can include one or more tanks and/or columns in which the ion-removal operation is performed. For example, in certain embodiments, the ion-removal apparatus comprises one or more tanks into which the aqueous feed stream and the ion-removal medium are transported. In one set of embodiments, the aqueous feed stream and a precipitation-inducing ion-removal medium are fed to a series of tanks in which precipitation of scale-forming ions is allowed to occur. In other embodiments, a column (e.g., a packed column) can be used to perform the ion-removal operation. For example, in some embodiments, the aqueous solution can be fed to one or more packed columns containing an ion-exchange resin or other ion-removal medium, which may be used to remove at least a portion of the scale-forming ion(s) from the aqueous solution. One of ordinary skill in the art, given the present disclosure, would be capable of designing a variety of other suitable configurations for performing the ion-removal steps described herein.

The ion-removal apparatus may be fluidically connected to one or more other unit operations of the water treatment system, either directly or indirectly. In certain embodiments, the ion-removal apparatus is fluidically connected to the desalination apparatus. In some such embodiments, the ion-removal apparatus and the desalination apparatus are directly fluidically connected. Referring to FIG. 3, for example, ion-removal apparatus 302 is directly fluidically connected to desalination apparatus 102, via stream 308. In certain embodiments, there are no unit operations located between the ion-removal apparatus and the desalination apparatus. That is to say, in some embodiments, the output from the ion-removal apparatus can be directly transported to the desalination apparatus without passing through any intermediate unit operations.

Certain embodiments are related to systems and methods for the removal of scale from solid surfaces, such as solid surfaces within a water treatment system. In some such embodiments, after scale has been formed within one or more portions of the water treatment system (e.g., in a portion of the desalination apparatus, such as in a concentrator (e.g., humidifier) and/or heat exchanger of a desalination apparatus), scale removal methods can be used to remove solid scale from the solid surface on which the scale is formed. In certain embodiments, at least a portion of the scale on a solid surface of a humidification-dehumidification desalination apparatus can be removed from the humidification-dehumidification desalination apparatus.

In some embodiments, scale removal methods can be used to remove solid scale from at least one surface of a heat exchanger within the water treatment system (e.g., a heat exchanger of a desalination apparatus, such as heat exchanger 216 and/or heat exchanger 218 in FIG. 2). Such scale may form, for example, during shutdown if supersaturated water remains quiescent in the heat exchanger for an extended period of time. In some such cases, the high velocities needed to prevent scaling are not present, and scale deposits from the stagnant aqueous solution. The removal of scale from heat exchangers can be important in ensuring proper function of certain water treatment systems because, in certain water treatment systems, scale formation within the heat exchanger(s) has a much detrimental impact on system performance than does scale formation elsewhere in the system. In some such systems, this enhanced decrease in performance is primarily because the thermal conductivity of the scale is orders of magnitude lower than the thermal conductivity of the metal used as the heat exchange surface.

According to some such embodiments, scale on the solid surface can be at least partially removed by exposing the scale to a liquid composition (e.g., an aqueous liquid composition) comprising at least one multivalent ligand. In certain embodiments, the multivalent ligand and a cationic species within the scale on the solid surface form a complex that is substantially soluble in the liquid composition. After the multivalent ligand forms the complex with the cationic species, the complex can be dissolved in the liquid medium and the scale can be removed from the solid surface. As one particular example, the strontium cation in strontium sulfate scale can be chelated using a multivalent ligand such as diethylenetriaminepentaacetic acid (DTPA). The chelated ions have a high solubility in water, and thus, will dissolve in an aqueous liquid composition. After dissolving in the liquid composition, the dissolved complexes can be transported away by purging the liquid composition from the heat exchanger.

Any multivalent ligand that can form a complex with one or more ions of a scale-forming salt can be used in the liquid scale-removal composition. In some embodiments, the multivalent ligand can comprise a divalent ligand, a trivalent ligand, a tetravalent ligand, a pentavalent ligand, and/or a hexavalent ligand. Examples of multivalent ligands that can be used include, but are not limited to, triphosphate; nitrilotriacetic acid (NTA); inosine triphosphate; 3,4-dihydroxybenzoic acid; uridine triphosphate; ATP; citric acid; oxalic acid; ADP; kojic acid; trimetaphosphate; maleic acid; globulin; casein; albumin; adipic acid; fumaric acid; malic acid; (+)-tartaric acid; glutamic acid; citraconic acid; itaconic acid; succinic acid; aspartic acid; glutaric acid; ethylenediaminetetraacetic acid (EDTA); and diethylenetriaminepentaacetic acid (DTPA).

According to certain embodiments, the liquid composition used to remove scale from a solid surface of the water treatment system comprises oxalate anions. In certain embodiments, the liquid composition used to remove scale from a solid surface of the water treatment system comprises oxalate anions and diethylenetriaminepentaacetic acid (DTPA). Without wishing to be bound by any particular theory, it is believed that the combination of oxalate anions and DTPA exhibit a synergy that allows the combination of the two chemicals to remove much more scale than could be removed using either of the two chemicals alone.

In some embodiments, the liquid composition used to remove scale from solid surfaces has a basic pH. For example, in some embodiments, the liquid composition has a pH of at least about 8, at least about 10, at least about 12, or at least about 13 (and/or, in some embodiments, a pH of up to about 14, or higher). The pH of the liquid composition can be raised, according to certain embodiments, by adding hydroxide ions to the liquid composition. This can be achieved, for example, by dissolving one or more hydroxide salts (e.g., potassium hydroxide, sodium hydroxide, or any other suitable hydroxide salt) within the liquid composition.

The liquid compositions used to remove scale as described above can be used to remove any type of scale, including any of the scaling salts mentioned elsewhere herein. In certain (although not necessarily all) embodiments, the liquid compositions used to remove scale can be especially effective in removing strontium-containing scale (e.g., salts containing $Sr^{2+}$ ions such as, for example, strontium carbonate, strontium bicarbonate, strontium sulfate, strontium bisulfate, and the like).

In some embodiments, the liquid composition used to at least partially remove the scale is a cleaning liquid fed to the desalination apparatus separately from the saline solution the desalination apparatus is configured to treat. For example, in the set of embodiments illustrated in FIG. 4, water treatment system 400 comprises optional source 402 of de-scaling liquid, which can comprise a multivalent ligand, as described above. In some such embodiments, after a desalination operation has been run using desalination apparatus 102 (and, in some cases, optional ion-removal apparatus 302), de-scaling liquid from source 402 can be transported to desalination apparatus 102 via conduit 404. For example, conduit 404 can be fluidically connected (directly, or otherwise) to the humidifier and/or one or more heat exchangers within desalination apparatus 102. In some such embodiments, de-scaling liquid can be returned to source 402 from desalination apparatus 102 via conduit 406. In some embodiments, the de-scaling liquid can be circulated through the desalination apparatus (e.g., one or more heat exchangers of the desalination apparatus), for example, until cleaning is finished and/or until the de-scaling liquid cannot dissolve anymore scale. According to certain embodiments, when the de-scaling liquid is incapable of dissolving further scale, it can be replaced with fresh de-scaling liquid.

Figure 4:
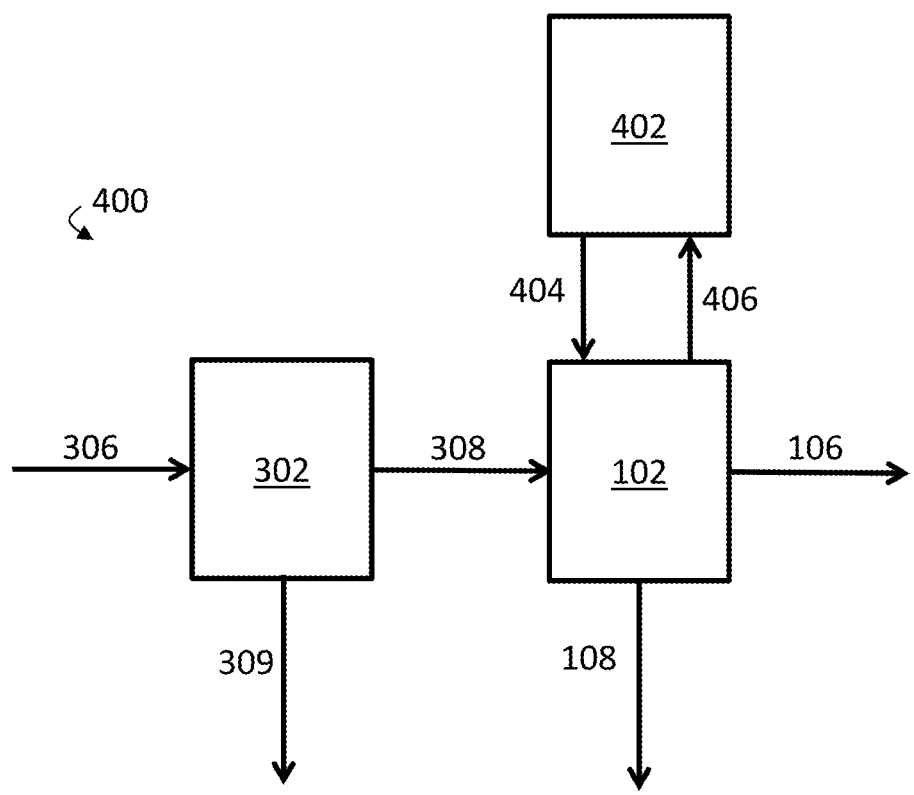
FIG. 4 is, according to some embodiments, a schematic illustration of a water treatment system comprising a source of de-scaling liquid.

While the de-scaling liquid is illustrated as being transported along a conduit that is separate from the saline feed conduit 308 in FIG. 4, it should be understood that, in other embodiments, the de-scaling liquid can be transported to the desalination apparatus using the same conduit that is used to transport aqueous saline streams (that are to be desalinated) to the desalination apparatus. The de-scaling liquid can be used to remove scale from any portion of desalination apparatus 102. For example, referring to FIG. 2, de-scaling liquid can be used to remove scale from humidifier 206, heat exchanger 216, heat exchanger 218, and/or any conduit fluidically connected to and/or between these unit operations.

In some embodiments, the liquid composition used to at least partially remove scale from the water treatment system can be fed to the desalination apparatus as part of a de-scaling procedure temporally separate from the desalination process. For example, in some embodiments, a desalination process is performed over a first period of time and, subsequently and over a second period of time that does not substantially overlap with the first period of time, a de-scaling operation can be performed in which at least a portion of the solid scale formed in the water treatment system during the desalination process is removed from the water treatment system. Two periods of time are said to not substantially overlap with each other when the total amount of time over which the two periods of time overlap is less than 5% of the shorter of the two periods of time. In some embodiments, two periods of time that do not substantially overlap with each other occur such that the total amount of time over which the two periods of time overlap is less than 2%, less than 1%, or less than 0.1% of the shorter of the two periods of time.

Various of the unit operations described herein can be "directly fluidically connected" to other unit operations and/or components. Generally, a direct fluid connection exists between a first unit operation and a second unit operation (and the two unit operations are said to be "directly fluidically connected" to each other) when they are fluidically connected to each other and the composition of the fluid does not substantially change (i.e., no fluid component changes in relative abundance by more than 1%) as it is transported from the first unit operation to the second unit operation. In certain embodiments in which two units are directly fluidically connected, the phase of the fluid leaving the first unit is the same as the phase of the fluid entering the second unit. As an illustrative example, a stream that connects first and second unit operations, and in which the pressure and temperature of the fluid is adjusted but the composition of the fluid is not altered, would be said to directly fluidically connect the first and second unit operations. If, on the other hand, a separation step is performed and/or a chemical reaction is performed that substantially alters the composition of the stream contents during passage from the first component to the second component, the stream would not be said to directly fluidically connect the first and second unit operations.

U.S. Provisional Patent Application Ser. No. 62/067,318, filed Oct. 22, 2014, and entitled "Selective Scaling in Desalination Water Treatment Systems and Associated Methods" is incorporated herein by reference in its entirety for all purposes.

The following examples are intended to illustrate certain embodiments of the present invention, but do not exemplify the full scope of the invention.

EXAMPLE 1

This example describes the operation of a water treatment system in which desalination is performed, in which the flow velocity of the aqueous solution within the water treatment system is manipulated to form scale selectively within the humidifier of the desalination apparatus of the water treatment system.

The water treatment system used in this example included an ion-removal apparatus and a desalination apparatus, similar to the system illustrated in FIG. 3. The desalination apparatus was a humidification-dehumidification desalination apparatus, similar to the apparatus illustrated in FIG. 2.

Before transporting the aqueous stream to the ion-removal apparatus, the incoming saline water was first fed to the two flow equalization tanks. The flow equalization tanks were used to settle and skim oil and grease out of the saline water. The saline water from the flow equalization tanks were then fed to the ion-removal apparatus. The ion-removal apparatus included two 2800 gallon reaction tanks. In the first reaction tank, soda ash and a coagulant were added, which led to the formation of insoluble carbonates of calcium, magnesium, barium and strontium. The contents of the first reaction tank were then transported to a second reaction tank (2800 gallons), to which caustic soda was added, causing the formation of insoluble hydroxides and carbonates of calcium and magnesium.

After filtering out the precipitated salts (mostly consisting of insoluble carbonates and hydroxides), the aqueous stream was transported to a humidification-dehumidification apparatus. A packed bed humidifier was used in the humidification-dehumidification apparatus. A carrier gas (ambient air in this case) was fed to the humidifier at a flow rate of 4000 cubic feet per minute for every 500 U.S. barrels per day of fresh water produced. Humidification of the carrier gas was achieved by spraying the ion-diminished stream from the ion-removal apparatus located at the top of the humidifier through a glass-filled polypropylene packing material while the carrier gas traveled through the humidifier. The humidified carrier gas was subsequently transported to a stainless steel bubble column condenser in fluid communication with a heat exchanger.

The amounts of scale-forming ions that were removed from the aqueous input stream by the ion-removal apparatus were controlled by adjusting the amounts of soda ash, coagulant, and caustic soda added to the aqueous stream. Table 1 shows constituent concentrations of saline stream fed to the ion-removal apparatus and to the desalination apparatus

TABLE 1

Constituent concentrations of saline solution fed to the ion-removal apparatus and fed to the desalination apparatus in Example 1.

| Constituent | System feed | Feed to desalination apparatus | Units |
| --- | --- | --- | --- |
| Barium | 4.5 | 11.7 | mg/L |
| Bromide | 4620 | 1900 | mg/L |
| Calcium | 2890 | 1290 | mg/L |
| Chloride | 67600 | 67100 | mg/L |
| Sulfate | 534 | 146 | mg/L |
| Magnesium | 552 | 33.5 | mg/L |
| Oil & Grease | 9.8 | ND | mg/L |
| Sodium | 37400 | 40600 | mg/L |
| Strontium | 777 | 455 | mg/L |
| Benzene | 2320 | 65.2 | ug/L |
| Toluene | 1740 | 16.9 | ug/L |
| PH | 6.8 | 8.48 | STD Units |
| Hardness as $Ca^{2+}$ | 7660 | 3360 | mg/L |
| Total Dissolved Solids | 117000 | 124000 | mg/L |
| Total Suspended Solids | 277 | 183 | mg/L |

Local flow velocities within the water treatment system were manipulated such that scale was selectively formed in the humidifier of the humidification-dehumidification desalination apparatus, and limited scale was formed in other parts of the water treatment system (such as on surfaces of heat exchangers of the desalination apparatus). The selective formation of scale within the humidifier stemmed from the new fundamental understanding that scale inception—and by extension growth of scaling compounds post-inception—is significantly more probable in stagnant and laminar flow streams than in turbulent flow streams. By removing only a portion of the scale-forming ions and controlling the formation of scale via flow velocity manipulation, a sufficient amount scale-forming ions was removed to significantly reduce scaling on heat transfer surfaces while avoiding the high cost of completely eliminating scale-forming ions from the water treatment system.

The local flow velocities of the saline streams were controlled by sizing the heat exchanger of the desalination apparatus, the fluidic conduits in the water treatment system, and the dehumidifier of the desalination apparatus such that the cross-sectional areas of the fluidic pathways within these components were substantially smaller than the fluidic pathways through the humidifier packing. During operation, the average local flow velocity of the saline solution through the heat exchanger of the desalination apparatus was 3.63 feet/second. In contrast, the local flow velocity of the saline solution through the packing of the humidifier was just 0.6 feet/second, over five times lower than the average local flow velocity within the dehumidifier.

In this example, the supersaturation index of the saline stream entering the humidifier with respect to the scale-forming compounds was 8.33 (as determined by the amount of strontium sulfate in the feed, which also happened to be the least soluble ion in the feed composition). The concentrated saline stream was recirculated in the water treatment system and concentrated until the supersaturation index of the saline stream with respect to the scale-forming compounds (again, as determined by the concentration of strontium sulfate) reached 16.12. At this point, the concentrated saline stream was discharged from the water treatment system, and the process was repeated.

Under the conditions outlined above, it was expected that strontium sulfate would form scale in the heat exchanger within two hours. Unexpectedly, substantially no drop in thermal or hydraulic performance (which would be indicative of scale formation) was noticeable after an operation period of 6.5 days. After the 6.5 day operation period, the heat exchanger was disassembled and examined. Unexpectedly, only a small amount of solids had been formed on the heat exchanger. The solids were present as a thin layer of fine powder on the process side of the heat exchanger plates. X-ray diffraction analysis showed that the composition of the solids were as follows: 75-95% Celestine ($SrBa(SO_4)_2$) and 5-20% strontium titanium oxide. On the other hand, after the 6.5 day operation period, a relatively large amount of scale had been formed on the packed bed humidifier.

EXAMPLE 2

This example describes the operation of a water treatment system in which desalination is performed, in which selective scaling strategies were not employed. In this example, the water treatment system described in Example 1 was operated such that the pretreatment systems removed oil and grease, but no chemicals were added in the ion-removal apparatus. Thus, the saline stream exiting the ion-removal apparatus had substantially the same amount of scale-forming ions as the saline feed. Table 2 shows constituent concentrations of saline stream fed to the system and to the desalination apparatus in this example.

TABLE 2

Constituent concentrations of saline solution fed to the ion-removal apparatus and fed to the desalination apparatus in Example 3.

| Constituent | Feed to ion-removal apparatus | Feed to desalination apparatus | Units |
| --- | --- | --- | --- |
| Barium | 4.5 | 4.5 | mg/L |
| Bromide | 4620 | 4620 | mg/L |
| Calcium | 2890 | 2890 | mg/L |
| Chloride | 67600 | 67600 | mg/L |
| Sulfate | 534 | 534 | mg/L |
| Magnesium | 552 | 552 | mg/L |
| Oil & Grease | 9.8 | ND | mg/L |
| Sodium | 37400 | 37400 | mg/L |
| Strontium | 777 | 777 | mg/L |
| Benzene | 2320 | ND | ug/L |
| Toluene | 1740 | ND | ug/L |
| PH | 6.8 | 6.8 | STD Units |
| Hardness as $Ca^{2+}$ | 7660 | 7660 | mg/L |
| Total Dissolved Solids | 117000 | 117000 | mg/L |
| Total Suspended Solids | 277 | ND | mg/L |

The water treatment system ran for 6 days under these conditions before the heat exchangers clogged and forced a shutdown. Inception of scale occurred after just one 12 hour shift. The inception of scale was indicated by a reduction in the heat transfer rates of the hottest parts of the heat exchanger in the water treatment system. Thermal efficiency and clean water production steadily decreased over the next 6 days until the water treatment system was shut down. After shut down, plates were removed from the desalination heat exchanger, on which scale had been formed (which was clearly visible without magnification). X-ray diffraction was used to determine the composition of the scale, which indicated that the scale was made up nearly entirely of strontium sulfate.

To bring the water treatment system back online, each plate was cleaned by hand. While the cost of pre-treating the saline stream using the ion-removal apparatus in this configuration was negligible, the cost associated with the down-time of the water treatment system, reduced production time, and thermal inefficiency were very high.

EXAMPLE 3

This example describes the operation of a water treatment system in which the temperature of the aqueous solution within the water treatment system was manipulated to form scale within a selected location within the water treatment system.

The water treatment system described in Example 2 was operated using two heat exchangers. The first heat exchanger was used to transfer a portion of the heat from the water-containing stream exiting the dehumidifier of the desalination apparatus to the saline solution fed to the humidifier of the desalination apparatus (to pre-heat the saline solution entering the humidifier). The second heat exchanger was used to transfer a portion of the heat from other units within the water treatment system to the saline solution fed to the desalination apparatus. The range of temperatures within which the second heat exchanger was operated (210° F.-240° F.) was substantially higher than the range of temperatures within which the first heat exchanger was operated (140° F.-170° F.). During operation of the water treatment system as described in Example 2, the heat transfer rates observed in the second heat exchanger substantially decreased, while no decrease in thermal transfer was observed in the first heat exchanger. After operating the system for 12 hours and subsequently shutting down the system, the second heat exchanger was disassembled and examined, revealing the formation of large amounts of scale. On the other hand, no evidence of scaling was observed in the first heat exchanger.

EXAMPLE 4

This example describes the prevention of scaling within a desalination apparatus of a water treatment system by removing substantially all of the scale-forming ions in the ion-removal apparatus.

In this example, the water treatment system described in Example 1 was operated such that the supersaturation index (with respect to scale-forming compounds) of the saline stream exiting the ion-removal apparatus was well below 1. Table 3 shows constituent concentrations of saline stream fed to the ion-removal apparatus and to the desalination apparatus.

TABLE 3

Constituent concentrations of saline solution fed to the ion-removal apparatus and fed to the desalination apparatus in Example 4.

| Constituent | Feed to ion-removal apparatus | Feed to desalination apparatus | Units |
| --- | --- | --- | --- |
| Barium | 4.5 | ND | mg/L |
| Bromide | 4620 | 4630 | mg/L |

TABLE 3-continued

Constituent concentrations of
saline solution fed to the ion-removal apparatus
and fed to the desalination apparatus in Example 4.

| Constituent | Feed to ion-removal apparatus | Feed to desalination apparatus | Units |
|---|---|---|---|
| Calcium | 2890 | 17 | mg/L |
| Chloride | 67600 | 67900 | mg/L |
| Sulfate | 534 | ND | mg/L |
| Magnesium | 552 | 7 | mg/L |
| Oil & Grease | 9.8 | ND | mg/L |
| Sodium | 37400 | 41000 | mg/L |
| Strontium | 777 | 19.1 | mg/L |
| Benzene | 2320 | ND | ug/L |
| Toluene | 1740 | ND | ug/L |
| PH | 6.8 | 8.9 | STD Units |
| Hardness as $Ca^{2+}$ | 7660 | 36 | mg/L |
| Total Dissolved Solids | 117000 | 11900 | mg/L |
| Total Suspended Solids | 277 | ND | mg/L |

The water treatment system was operated such that the concentrated saline stream exiting the humidifier (e.g., within stream 106 illustrated in FIG. 2) contained dissolved solids in a concentration of about 240,000 mg/L. Despite the high concentration of dissolved solids in the concentrated saline stream, the concentration of all scale-forming ions remained below saturation at all temperatures and flow conditions within the system. Continuous operation of this system over a period of several weeks led to no discernable scale formation in the heat exchangers. While no scale was formed, the operating costs of this system were higher than those of the system described in Example 1, due to the expense involved with reducing the concentration of scale-forming ions to levels well below supersaturation.

EXAMPLE 5

This example describes the use of liquid compositions comprising diethylenetriaminepentaacetic acid (DTPA) and oxalate anions to remove scale from solid surfaces. Tests were performed in which aqueous liquid compositions comprising DTPA alone, potassium oxalate alone, and a mixture of DTPA and potassium oxalate were used to dissolve strontium sulfate. A 2 liter combination of DTPA and potassium oxalate was capable of dissolving 40 grams of strontium sulfate. On the other hand, the same total volume of DTPA alone and the same total volume of potassium oxalate alone were unable to dissolve 1 gram of strontium sulfate in the same amount of time.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of desalinating water within a water treatment system, comprising:
    removing, within an ion-removal apparatus of the water treatment system, at least a portion of at least one scale-forming ion from a saline aqueous feed stream comprising the scale-forming ion and at least one dissolved monovalent salt to produce an ion-diminished stream containing less of the scale-forming ion relative to the saline aqueous feed stream;
    transferring heat, within a heat exchanger of the water treatment system, from a first heat exchanger stream to at least a portion of the ion-diminished stream to heat the ion-diminished stream;
    evaporating, within a humidifier of the water treatment system, water from the heated ion-diminished stream into a gaseous stream to produce a concentrated saline stream, which is enriched in a dissolved monovalent salt relative to the saline aqueous feed stream, and a humidified gaseous stream;
    condensing, within a dehumidifier of the water treatment system fluidically connected to the humidifier, water from the humidified gaseous stream to produce a water-containing stream and a dehumidified gaseous stream; and
    operating the water treatment system to establish a temperature and/or flow velocity of the ion-diminished stream within the humidifier such that scale is formed within the humidifier and at least about 60 wt % of all scale formed in the water treatment system is formed in the humidifier.

2. The method of claim 1, wherein at least a portion of the scale formed in the humidifier is formed on at least a portion of exposed surface of packing within the humidifier.

3. The method of claim 1, wherein operating the water treatment system to establish a temperature and/or flow velocity of the ion-diminished stream within the humidifier comprises establishing a temperature of the ion-diminished stream to form the scale within the humidifier.

4. The method of claim 3, wherein establishing the temperature of the ion-diminished stream to form scale comprises heating the ion-diminished stream to form scale within the humidifier.

5. The method of claim 1, wherein operating the water treatment system to establish a temperature and/or flow velocity of the ion-diminished stream within the humidifier comprises establishing a flow velocity of the ion-diminished stream within the humidifier to form scale within the humidifier.

6. The method of claim 1, wherein removing at least a portion of the at least one scale-forming ion within the ion-removal apparatus comprises precipitating at least a portion of the at least one scale-forming ion within the ion-removal apparatus.

7. The method of claim 1, wherein the at least one scale-forming ion comprises $Mg^{2+}$, $Ca^{2+}$, $Sr^{2+}$, $Ba^{2+}$, a carbonate anion, a bicarbonate anion, a sulfate anion, a bisulfate anion, dissolved silica, and/or a hydroxide anion.

8. The method of claim 1, wherein a supersaturation index of the ion-diminished stream exiting the ion-removal apparatus, with respect to scale-forming compounds, is at least about 0.9.

9. The method of claim 1, wherein a supersaturation index of the concentrated saline stream, with respect to scale-forming compounds, is at least about 0.9.

10. The method of claim 1, wherein a supersaturation index of the concentrated saline stream, with respect to scale-forming compounds, is less than 1.

11. The method of claim 1, wherein the concentrated saline stream includes dissolved salts such that the concentrated saline stream has a density of from about 9 pounds per gallon to about 11 pounds per gallon.

12. The method of claim 1, wherein the saline aqueous feed stream contains supersaturated levels of $BaSO_4$, $SrSO_4$, $BaCO_3$, and/or $SrCO_3$ prior to being transported to the ion-removal apparatus.

13. The method of claim 1, wherein at least a portion of the dehumidified gaseous stream is recycled back to the humidifier.

14. The method of claim 1, wherein the water-containing stream contains water in an amount of at least about 75 wt %.

15. The method of claim 1, wherein the humidifier and the dehumidifier are directly fluidically connected.

16. The method of claim 1, wherein the ion-removal apparatus and the desalination apparatus are directly fluidically connected.

17. The method of claim 1, wherein the gaseous stream directly contacts the saline aqueous feed stream within the humidifier.

18. The method of claim 1, wherein the humidified gaseous stream directly contacts the water-containing stream within the dehumidifier.

19. The method of claim 1, wherein the dehumidifier comprises a bubble-column condenser.

20. The method of claim 1, comprising transporting a liquid composition comprising a multivalent ligand to the water treatment system such that the multivalent ligand removes at least a portion of scale from a solid surface of the water treatment system.

21. The method of claim 20, wherein the liquid composition comprises diethylenetriaminepentaacetic acid (DTPA).

22. The method of claim 20, wherein the liquid composition comprises oxalate anions.

23. The method of claim 20, wherein the multivalent ligand removes scale from a solid surface of the heat exchanger of the water treatment system.

* * * * *